United States Patent [19]

Horimai

[11] Patent Number: 5,896,360
[45] Date of Patent: Apr. 20, 1999

[54] OPTICAL PICKUP DEVICE AND OPTICAL DISC DRIVING APPARATUS HAVING LIGHT POLARIZING HOLOGRAM

[75] Inventor: Hideyoshi Horimai, Kanagawa, Japan

[73] Assignee: Sony Corporation, Tokyo, Japan

[21] Appl. No.: 08/666,561

[22] PCT Filed: Nov. 10, 1995

[86] PCT No.: PCT/JP95/02302

§ 371 Date: Jun. 28, 1996

§ 102(e) Date: Jun. 28, 1996

[87] PCT Pub. No.: WO96/15530

PCT Pub. Date: May 23, 1996

[30] Foreign Application Priority Data

Nov. 10, 1994 [JP] Japan ................. 6/276781

[51] Int. Cl.$^6$ .................................. G11B 7/00
[52] U.S. Cl. ............... 369/112; 369/110; 369/44.23; 369/44.37
[58] Field of Search ............... 369/44.14, 44.23, 369/44.12, 110, 112, 103, 109, 44.37

[56] References Cited

U.S. PATENT DOCUMENTS

| | | | |
|---|---|---|---|
| 5,231,620 | 7/1993 | Ohuchida | 369/44.14 |
| 5,297,125 | 3/1994 | Yamagami et al. | 369/44.13 |
| 5,361,244 | 11/1994 | Nakamura et al. | 369/44.23 |
| 5,483,509 | 1/1996 | Yang et al. | 369/44.23 |
| 5,495,461 | 2/1996 | Komma et al. | 369/110 |
| 5,663,940 | 9/1997 | Horimai et al. | 369/44.23 |

FOREIGN PATENT DOCUMENTS

| | | |
|---|---|---|
| 0579843 A1 | 1/1994 | European Pat. Off. . |
| 57-88540 | 6/1982 | Japan . |
| 59-96551 | 6/1984 | Japan . |
| 59-121637 | 7/1984 | Japan . |
| 59-79446 | 8/1984 | Japan . |
| 59-191156 | 10/1984 | Japan . |
| 61-90346 | 5/1986 | Japan . |
| 61-160852 | 7/1986 | Japan . |
| 62-66452 | 3/1987 | Japan . |
| 63-138533 | 6/1988 | Japan . |
| 63-200346 | 8/1988 | Japan . |
| 63-247941 | 10/1988 | Japan . |
| 63-291238 | 11/1988 | Japan . |
| 64-55745 | 3/1989 | Japan . |
| 1-55746 | 3/1989 | Japan . |
| 1-55747 | 3/1989 | Japan . |
| 1-315036 | 12/1989 | Japan . |
| 2-301029 | 12/1990 | Japan . |
| 4-212742 | 8/1992 | Japan . |
| 5-205338 | 8/1993 | Japan . |
| 6-162547 | 6/1994 | Japan . |
| 7-114746 | 5/1995 | Japan . |

*Primary Examiner*—Thang V. Tran
*Attorney, Agent, or Firm*—Limbach & Limbach LLP

[57] ABSTRACT

An outgoing light beam from a laser light source 42 of a laser module 41 is radiated via a light polarizing hologram 51 on a two-segment optical rotation plate 52 of a movable unit. The two-segment optical rotation plate 52 is comprised of a right rotation plate 52R and a left rotation plate 52L divided along a line extending along the radius of an optical disc with the optical axis as the center, and rotates the outgoing light from the laser light source 42 by pre-set angles. The two-segment rotation plate 52 is arranged between the light polarizing hologram 51 and an objective lens 53. The outgoing light, rotated by the two-segment rotation plate 52, is radiated on the optical disc 33 via the objective lens 53. The reflected light from the light polarizing hologram 51 is passed via the objective lens 53 to the two-segment rotation plate 52 so as to be rotated further by pre-set angles by the right rotation plate 52R and the left rotation plate 52L. The light polarizing hologram 51 bends the light path of the outgoing light from the optical disc 33, rotated by the two-segment rotation plate 52, responsive to the direction of light polarization, and radiates the outgoing light. The focusing error signals (FE signals) or magneto-optical signals (MO signals) are derived on the basis of detection signals by photodetectors 44 to 48 receiving the reflected light from the optical disc 33 incident via the light polarizing hologram 51.

3 Claims, 18 Drawing Sheets

FIG.19(A) DIRECTION OF DISC RADIUS 5,896,360

OPTICAL PICKUP DEVICE AND OPTICAL DISC DRIVING APPARATUS HAVING LIGHT POLARIZING HOLOGRAM

TECHNICAL FIELD

This invention relates to an optical pickup device and an optical disc driving apparatus adapted for employing a variety of optical discs, such as a play-only optical disc, a recordable phase-change optical disc or a magneto-optical disc.

BACKGROUND ART

As optical discs for recording/reproducing the information by irradiation of a laser beam, a magneto-optical disc, a variety of write-once optical discs, a digital audio discs, such as a so-called compact disc or an optical video disc, have been put to practical use.

Of these optical discs, the compact disc or the optical video disc is a play-only disc, and is comprised of a transparent substrate, in which data pits corresponding to information signals are formed as recesses, and a reflective layer formed on the transparent substrate.

As the transparent substrate, a disc-shaped substrate, formed by injection molding a resin, such as polycarbonate, is predominantly employed, since the cost may be lowered especially in case of mass production. On concentric or spirally extending track(s) of the transparent substrate, there are formed data pits as recesses. The reflective layer is layered on the surface of the transparent substrate carrying the data pits. In general, an Al reflective film is used because it has high reflectance and good thermal conductivity.

With the above-described play-only optical disc, the difference in the amount of reflected light between the pits and mirrors, that is disc portions devoid of the pits, on laser light irradiation from the transparent substrate, is detected, and a bit pattern on the track(s) is accordingly reproduced.

For correctly reproducing error-free signals by the above technique, laser light spots need to be radiated correctly on a track on which a bit pattern to be read out is formed. To this end, the optical disc driving apparatus performs tracking servo of the optical pickup device. Among optical disc systems for scanning the concentric or spirally extending track(s) with the laser light beam for recording/reproducing various sorts of data, there are known a CLV system for rotationally driving the optical disc at a constant linear velocity (CLV) for recording/reproducing data, and a CAV system for rotationally driving the optical disc at a constant angular velocity (CAV) for recording/reproducing data. There are also known a continuous servo system in which tracking control is done using a continuous pre-groove formed along the track, and a sample-servo system in which tracking control is done using servo areas provided discretely on the track(s).

A conventional optical pickup device for a magneto-optical disc is configured as shown for example in FIG. 1. During reproduction or recording, a laser beam as an outgoing light beam of a P-polarized component is radiated from a laser diode 1. This outgoing light is collimated by a collimator lens 2 so as to be shaped by a shaping prism 3 to fall on an S-polarizing beam splitter 4.

The S-polarizing beam splitter 4 has a light polarization beam splitter film 4a having characteristics of reflecting the S-polarized light component having the direction of polarization perpendicular to the P-polarized light component and reflecting and transmitting 50% of the P-polarized light and the remaining 50% thereof, respectively. Thus, one-half of the outgoing light of the P-polarized light, incident on the S-polarizing light beam splitter 4, is reflected, while the remaining one-half thereof is transmitted. The outgoing light transmitted through the S-polarizing beam splitter 4 is reflected by a 45°-mirror 5 and thence radiated via an objective lens 6 on a magneto-optical disc 7.

During recording, data is supplied via an input terminal 8 on a magnetic head 9. This drives the magnetic head 9 responsive to the data for generating a magnetic field corresponding to the data. This magnetic field is impressed on an area of the magneto-optical disc 7 irradiated with the laser beam for recording data thereon.

A reflected light beam is produced by the magneto-optical disc 7 being irradiated with the outgoing light. This reflected light is reflected by the 45° mirror 5 via the objective lens 6 to fall on the S-polarizing beam splitter 4.

This reflected light is polarized responsive to data recorded on the magneto-optical disc 7 and thereby reflected as an S-polarized light component. The amount of the polarized light is delicate and the major portion of the reflected light is the P-polarized light component. The S-polarizing beam splitter 4 reflects 100% of the S-polarized light component, while reflecting and transmitting 50% and the remaining 50% of the P-polarized light component, respectively. Thus, as for the reflected light, the reflected portion of the S-polarized light beam is reflected in its entirety by the S-polarization beam splitter 4 to fall on a polarizing beam splitter 10, while one-half and the remaining half of the P-polarized light component are reflected by and transmitted through the S-polarizing beam splitter 4, respectively.

The polarizing light beam splitter 10 has a polarization light beam splitter film 10a has characteristics of transmitting the P-polarized light component in its entirety and reflecting the S-polarized light component in its entirety. Consequently, as for the reflected light incident on the polarizing beam splitter 10, the reflected light of the P-polarized component is transmitted through the polarization light beam splitter film 10a to fall on a servo signal detection system 11, while the light of the S-polarized component is reflected by the polarizing beam splitter film 10a so as to fall on a data detection system 12.

The reflected light of the P-polarized light component, incident on the servo signal detection system 11, is converged by a lens 13 and a cylindrical lens 14 to fall on a photodetector 15 used for detecting servo signals. The photodetector 15 receives the reflected light of the P-polarized light component and supplies a detection signal corresponding to the received light to a servo signal generating circuit, not shown. The servo signal generating circuit generates focusing error signals and tracking error signals, based upon the detection signal from the photodetector 15, and transmits the focusing error signal and the tracking error signal to servo control circuits, not shown. These servo control circuits effectuate tracking error control and focusing error control based upon the focusing error and tracking error signals. This assures data reproduction under just-track and just-focus conditions at all times. The S-polarization light beam splitter 4 reflects 50% of the P-polarized light component, while transmitting the remaining 50% thereof, while the servo signal detection system 11 detects the tracking error, and focusing error signals based upon the reflected light of the P-polarized light components reflected by the S-polarizing light beam splitter 4. Since the major portion of the reflected light is the P-polarized light component, the tracking and focusing errors may be detected with a sufficient light volume if the S-polarization light beam splitter 4 is configured for reflecting and transmitting 50% and the remaining 50% of the P-polarized light component, respectively.

The reflected light of the S-polarized light component, reflected by the polarization beam splitter 10, is converted by a λ/2 plate 16 of the data detection system 12 into a reflected light of the P-polarized light component which is then incident via a condensing lens 17 on a polarization beam splitter 18. The polarization beam splitter 18 has a polarization light beam splitter film 18a having characteristics of reflecting 50% of the P-polarized light component and transmitting the remaining 50% thereof. Thus the reflected light of the p-polarized light component, incident on the polarization beam splitter 18, is divided by the polarization beam splitter film 18a into two portions which are incident on data-detection photodiodes 19A, 19B.

The photodetectors 19A, 19B receive the two reflected light beams and transmit detection signals of signal levels corresponding to the volumes of the received light to a data detection circuit, not shown. The data detection circuit detects data based upon the detection signals and transmits the detected data to a data processing system. The data processing system processes the data in a preset manner and transmits the processed data to an external equipment, such as a computer or a speaker.

There has also been known a phase-change type optical disc 24 for recording data by exploiting changes in structure between the amorphous sate and the crystal state of a substance.

The optical pickup device, reproducing data from the phase-change optical disc, has a structure as shown in FIG. 2, and is configured for radiating a laser beams as an outgoing light of, for example, the P-polarized light component. The outgoing light is collimated by a collimator lens 21 and reflected by a 45° mirror 22 to fall on a hologram film 17.

The hologram film 27 is formed as a planar hologram in the shape of a refractive lattice functioning as a polarization beam splitter for transmitting the light of the P-polarized light components as it is and for radiating the light of the S-polarized light component after changing its light path. Thus the outgoing light of the P-polarized light component, incident on the hologram film 27, is directly transmitted through the hologram film 27 to fall on a quarter wave plate 28. The quarter wave plate 28 converts the linear-polarized radiation into circular polarized light which is radiated via an objective lens 29 on the phase-change optical disc 24.

The circular-polarized outgoing light is radiated on and reflected by the phase change optical disc 24, whereby the circular-polarized reflected light, opposite in the direction of polarization to the outgoing light, is produced. This S-polarized reflected light falls via the objective lens 29 on the quarter wave plate 28. When the circular-polarized light, opposite in the direction of polarization to the circular-polarized laser light beam, is incident on the quarter wave plate 28, the quarter wave plate 28 converts it into a reflected light of the S-polarized light component. This reflected light of the S-polarized light component falls on the hologram film 27.

The hologram film 27 has characteristics of functioning as a polarizing beam splitter for bending the light path of an incident light of the S-polarized light component a pre-set angle and radiating the light along the bent optical path. Thus the reflected light of the S-polarized light component, incident on the hologram film 27, has its light path bent by a pre-set angle by the hologram film 27, so as to be radiated on two photodetectors 26a, 26b of the laser module 20 via a 45° mirror 22 and the collimator lens 21.

The photodetectors 26a, 26b receive the reflected light and output detection signals corresponding to the received light volumes. These detection signals are supplied to signal processing systems, not shown. These signal processing systems detect the focusing and tracking error signals and data recorded on the phase change optical disc 24, based upon detection signals from the photodetectors 26a and 26b, and transmit these to a servo control system and to a data processing system. This enables the data to be read under the just-track and just-focus states.

The optical pickup device for the phase-change optical disc, shown in FIG. 2, is configured for bending the light path of the reflected light by exploiting the characteristics of the hologram film 27. Thus the reflected light can be received by the photodetectors 26a, 26b provided in the vicinity of the laser diode 25; thus enabling the overall light path to be reduced. In addition, the optical pickup device itself and the apparatus provided with such optical pickup device can be reduced in size.

However, with the optical pickup device for the magneto-optical disc, in which the outgoing light and the reflected light are split using the polarizing light beam splitters 4, 10 and 18 for detecting the data and the focusing and tracking error signals, the number of component parts and hence the costs are increased. In addition, since it is necessary to secure light paths for the reflected lights split by the beam splitters 4, 10 and 18, the optical pickup device itself is increased in size.

On the other hand, the P-polarized light components are reflected and transmitted in amounts of 50% by the polarizing light beam splitter 10. This reflectance is set on the basis of the volume of light radiated on the servo signal detection system 11 and the shot noise of the photodetector 15 for servo signal detection or the noise produced by double refraction by the magneto-optical disc 7. The coupling efficiency and the S/N ratio are related to each other by trade-off, such that, if the coupling efficiency is increased, the S/N ratio is lowered, whereas, if the S/N ratio is improved, the coupling efficiency is deteriorated.

Although the light path length may be reduced with the optical pickup device for the phase change optical disc for reducing the size of the optical pickup device itself, it is difficult to detect the playback data of low signal intensity from the magneto-optical disc because the quarter wave plate 28 is employed.

It is therefore an object of the present invention to provide an optical pickup device and an optical disc driving apparatus whereby the polarizing beam splitter is eliminated and the number of components may be diminished for reducing the size and cost.

It is another object of the present invention to provide an optical pickup device and an optical disc driving apparatus whereby the coupling efficiency and the S/N ratio may be improved for satisfactorily reproducing data recorded on the magneto-optical disc.

DISCLOSURE OF THE INVENTION

An optical pickup device according to the present invention includes a laser light source for radiating a laser light, an objective lens for radiating an outgoing light from the laser light source to an optical disc, optical rotation means arranged between the laser light source and the objective lens and being split into a right rotation plate and a left rotation plate along a splitting line extending along the radius of the optical disc with an optical axis as the center, a light polarization hologram arranged between the laser light source and the optical rotation means, and light receiving means for receiving the reflected light from the optical disc incident via the light polarizing hologram and outputting a detection signal of an output level corresponding to the volume of the received light. The light polarizing hologram transmits an outgoing light from the laser light source as it is from the laser light source without bending its light path and radiates a reflected light of the outgoing light which is illuminated on the optical disc along a light path bent responsive to the direction of polarization.

The light receiving means has at least three photodetectors for respectively receiving a O-order diffracted light, a +one order diffracted light component and a -one order diffracted light component of the reflected light from the optical disc passed through the optical rotation means by the light polarization hologram.

The light receiving means has a photodetector for receiving the +one order diffracted light component and a photodetector for receiving the -one order diffracted light component. Each photodetector has a plurality of light receiving areas obtained by splitting into at least two along a splitting line extending along the radius of the optical disc.

At least three photodetectors of the light receiving means are arranged so that, when the photodetector of such at least three photodetectors receiving the O-order diffracted light component is in the just-focus state, the volume of light received by one of such at least three photodetectors receiving the +one order diffracted light component will be equal to the volume of light received by one of such at least three photodetectors receiving the -one order diffracted light component.

The light polarizing hologram is a planar hologram in the shape of a diffraction lattice having a uniform lattice spacing throughout an entire hologram region. The photodetector receiving the +one order diffracted light component and the photodetector receiving the -one order diffracted light component are mounted with a pre-set distance ahead and at back of the optical axis with respect to the photodetector of such at least three photodetectors of the light receiving means receiving the O-order diffracted light component.

The light polarizing hologram is a substantially planar hologram in the shape of a diffractive lattice presenting a curvature so that a focal point with respect to the -one order diffracted light component differs from a focal point with respect to the -one order diffracted light component. The light receiving means has such at least three photodetectors arranged on substantially the same plane.

The light polarizing hologram is split by a splitting line extending along the radius of the optical disc into an area having formed therein a light polarizing hologram in the shape of a diffractive lattice having a coarse diffraction lattice spacing and an area having formed therein a light polarizing hologram in the shape of a diffractive lattice having a dense diffraction lattice spacing. The light receiving means has photodetectors for receiving the +one order diffracted light component and the -one order diffracted light component of the reflected light having passed through the left rotation plate of said optical rotation means and having the light path bent by the area of the light polarizing hologram having one of the light polarizing patterns of the light polarizing hologram. The light receiving means also has photodetectors for receiving the +one order diffracted light component and the -one order diffracted light component of the reflected light having passed through the right rotation plate of the optical rotation means and having the light path bent by the area of the light polarizing hologram having the other light polarizing patterns of the light polarizing hologram.

The light polarization hologram is split into four areas each having a center angle of 90° and having light polarizing hologram patterns formed for bending the reflected light having passed through the optical rotation means in four respectively different directions and radiating the thus bent reflected light. The light receiving means has a photodetector for receiving the O-order diffracted light component by the light polarizing hologram of the reflected light from the optical disc having passed through the optical rotation means and four photodetectors for receiving the reflected light bent in the four directions by the light polarizing hologram.

The light polarizing hologram, optical rotation means and the objective lens are unitarily constructed as a movable unit servo-controlled on the basis of a detection signal from the light receiving means. The laser light source and the light receiving means are unitarily constructed as a laser module associated with the movable unit.

An optical disc driving unit according to the present invention includes a laser light source for radiating a laser light, an objective lens for radiating an outgoing light from the laser light source to an optical disc, optical rotation means arranged between the laser light source and the objective lens and being split into a right rotation plate and a left rotation plate along a splitting line extending along the radius of the optical disc with an optical axis as the center, a light polarization hologram arranged between the laser light source and the optical rotation means, and light receiving means for receiving the reflected light from the optical disc incident via the light polarizing hologram and outputting a detection signal of an output level corresponding to the volume of the received light. The light polarizing hologram transmits an outgoing light from the laser light source as it is from the laser light source without bending its light path and radiating a reflected light of the outgoing light which is illuminated on the optical disc along a light path bent responsive to the direction of polarization. The light polarizing hologram, optical rotation means and the objective lens are unitarily constructed as a movable unit servo-controlled on the basis of a detection signal from the light receiving means. The laser light source and the light receiving means are unitarily constructed as a laser module associated with the movable unit. The optical disc driving apparatus also includes disc rotating driving means for rotating the optical disc and servo control means for controlling the movable unit based upon a detection signal from the light receiving means of the optical pickup device.

BEST MODE FOR CARRYING OUT THE INVENTION

Figure 1:
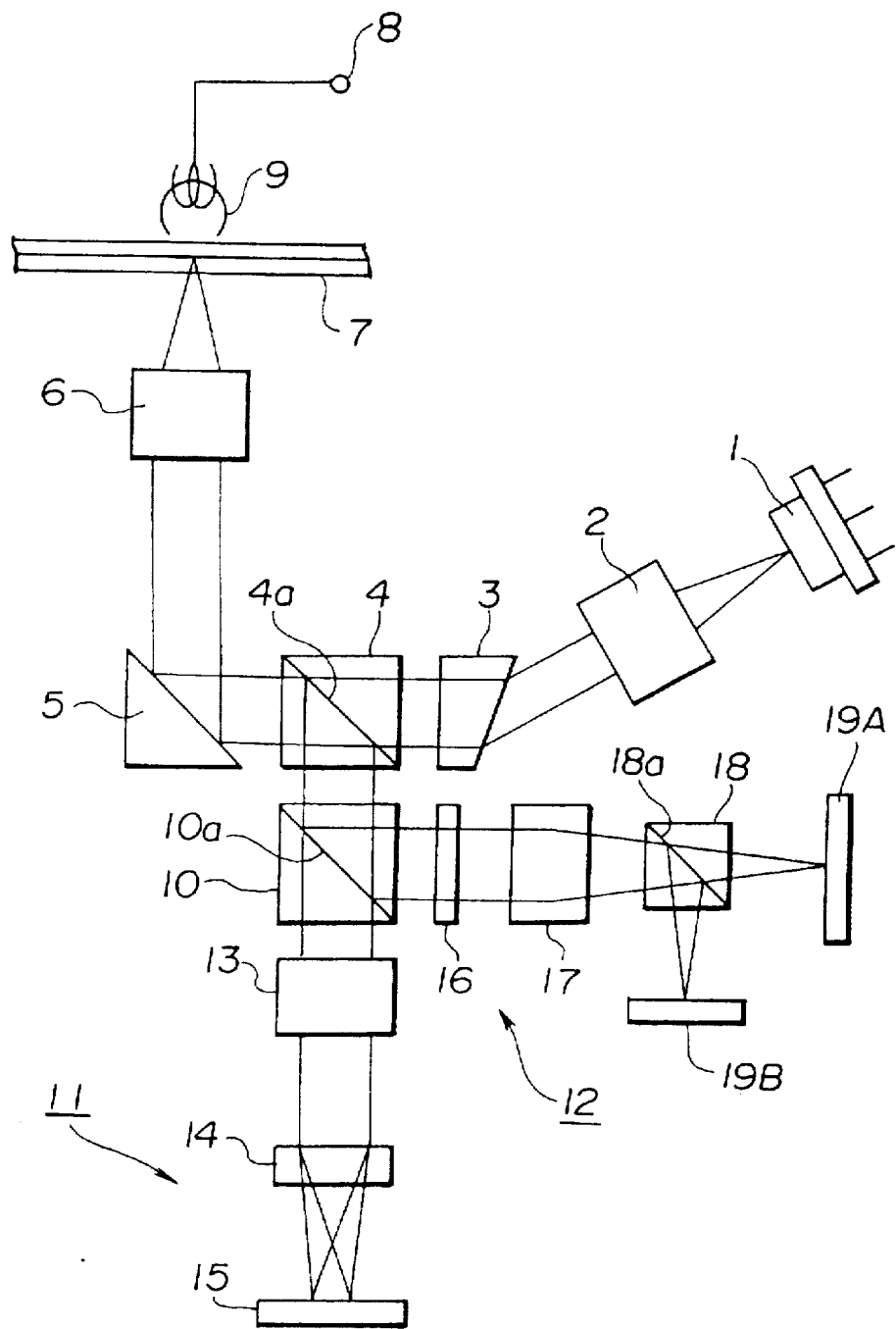
FIG. 1 illustrates the structure of a conventional optical pickup device for reproducing data recorded on a magneto-optical disc.
Figure 2:
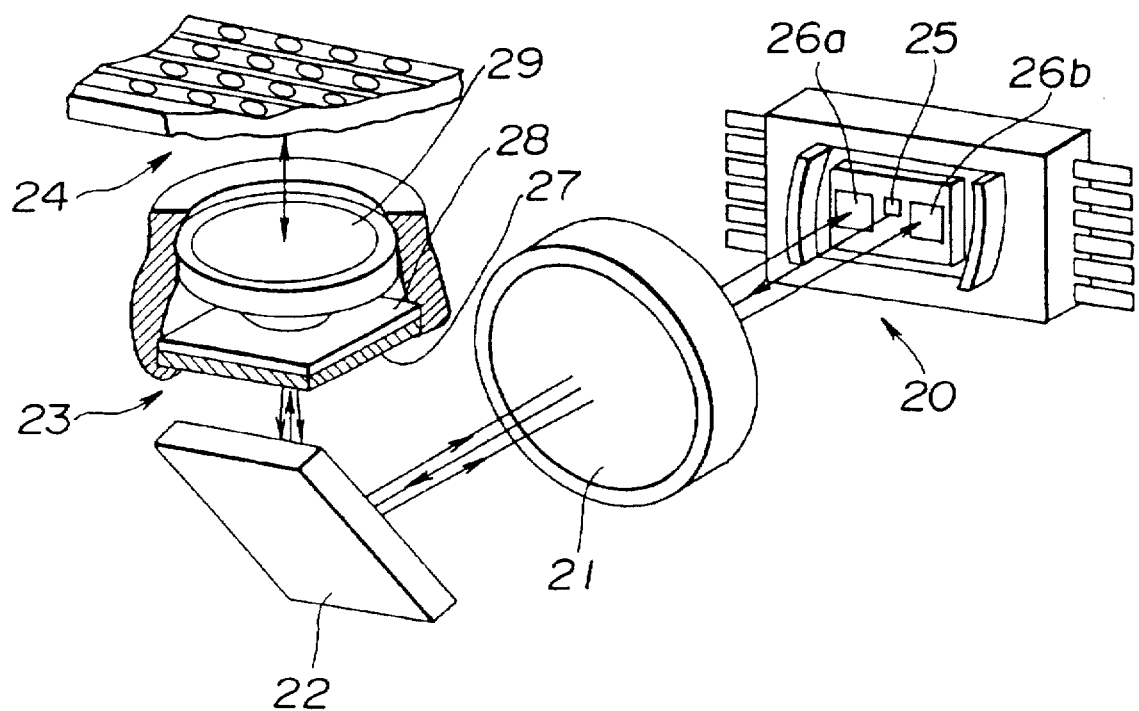
FIG. 2 illustrates the structure of a conventional optical pickup device for reproducing data recorded on a phase-change optical disc.

Referring to the drawings, the best mode for carrying out the present invention will be explained in detail.

Figure 3:
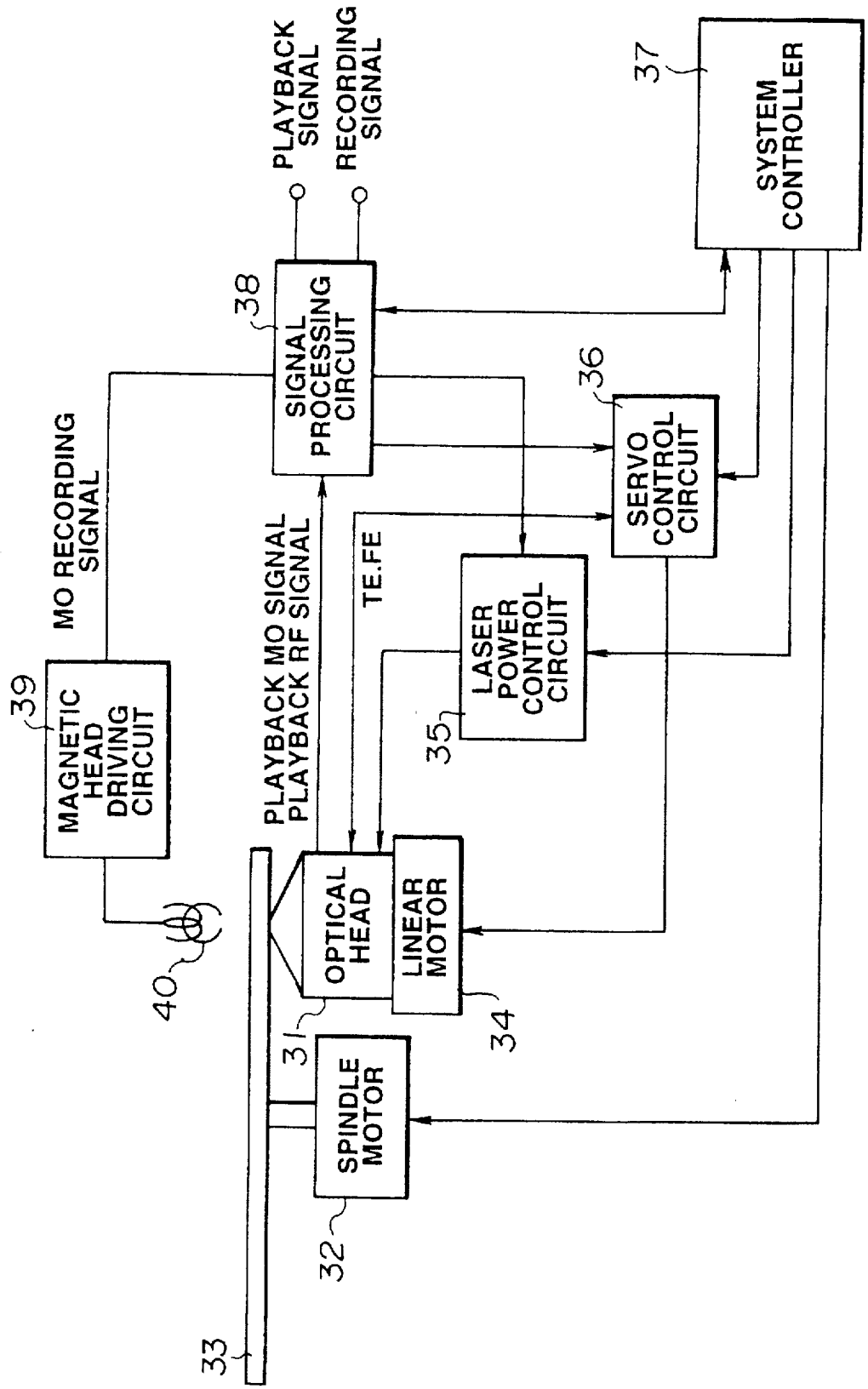
FIG. 3 is a block diagram showing the structure of an optical disc driving apparatus employing an optical pickup device according to the present invention.

The optical pickup device according to the present invention is employed as an optical head device in an optical disc driving apparatus configured as shown for example in FIG. 3.

In the optical disc driving apparatus, an optical head device 31 records/reproduces signals by optically scanning the recording surface of an optical disc 33 rotationally driven by a spindle motor 32 for recording/reproducing signals, and is configured for being moved radially of the disc by a linear motor 34. With the optical head device 31, the amount of the outgoing laser light beam is controlled by a laser power control circuit 35 so that the recording surface of the optical disc 33 is scanned with a pre-set volume of the laser beam suitable for recording/reproduction. The optical head device 31 transmits a tracking error signal THE and a focusing error signal FE, obtained on optically scanning the recording surface of the optical disc 33, so that servo control such as tracking or focusing control is done on the basis of the tracking error signal THE and the focusing error signal FE by a servo control circuit 36.

The present optical disc driving apparatus is adapted for employing a play-only optical disc or a variety of recordable optical discs, such as a phase-change optical disc or a magneto-optical disc. The optical disc driving apparatus is configured for being set by a system controller 37 to recording/reproducing modes for coping with the various optical discs.

For the recording mode for the phase-change optical disc, recording signals are processed by a signal processing circuit 38 with pre-set encoding or appendage of error correction codes. The processed recording signals are supplied to the laser power control circuit 35. The laser power control circuit 35 controls the light volume of the laser light beam radiated by the optical head device 31 in accordance with the recording signals for light modulating the laser beam with the recording signals. The optical head device 31, servo-controlled as described above, scans a desired area of the recording surface of the optical disc 31 with the laser beam light-modulated with the recording signals for recording signals on a phase-change recording area of the phase-change optical disc.

For the recording mode for the magneto-optical disc, recording signals are processed by the signal processing circuit 38 with pre-set encoding or appendage of error correction codes. The processed recording signals are supplied to a magnetic head driving circuit 39. The magnetic head driving circuit 39 drives a magnetic head 40 responsive to the recording signals. The magnetic head 40, facing the optical head device 31 with the optical disc 33 in-between, is moved by the linear motor 34 along the radius of the disc along with the optical head device 31. As the servo control as described above is going on, a desired area on the recording surface of the optical disc 33 is scanned by a laser beam from the optical head device 31, at the same time as it is scanned with a modulated magnetic field corresponding to the recording signals. Thus the modulated magnetic field, corresponding to the recording signals, is impressed on a magneto-optical area (MO area) raised in temperature to the Curie temperature by irradiation with the laser beam for recording signals on the MO area.

For the playback mode for the play-only optical disc or the phase-change optical disc, a desired area on the recording surface of the optical disc is optically scanned by the optical head device, as servo control as described above is going on, so that playback RF signals are produced from the optical disc or the phase-change optical disc and supplied to the signal processing circuit 38. The signal processing circuit 38 processes the playback RF signals supplied from the optical head device 31 with pre-set demodulation or error correction for generating playback signals.

For the playback mode for the magneto-optical disc, a desired area on the recording surface of the magneto-optical disc is optically scanned by the optical head device, as servo control as described above is going on, so that playback RF signals are produced from the magneto-optical disc is supplied to the signal processing circuit 38. The signal processing circuit 38 processes the playback RF signals supplied from the optical head device 31 with pre-set demodulation or error correction for generating playback signals. The optical pickup device, employed as the above-mentioned optical head device 31, is made up of a laser module 41 and a movable unit 50, as shown for example in FIGS. 4 and 5.

The laser module 41 is constructed as shown and described in JP Patent Kokai Publication JP-A-7-114746 proposed by the present Assignee, and is comprised of a laser diode 42 for radiating a laser beam in a direction parallel to the magneto-optical disc 33, a reflecting mirror 43 for reflecting the outgoing light from the laser diode 42 towards the magneto-optical disc 33 and first to fifth photodetectors 44 to 48.

Figure 6:
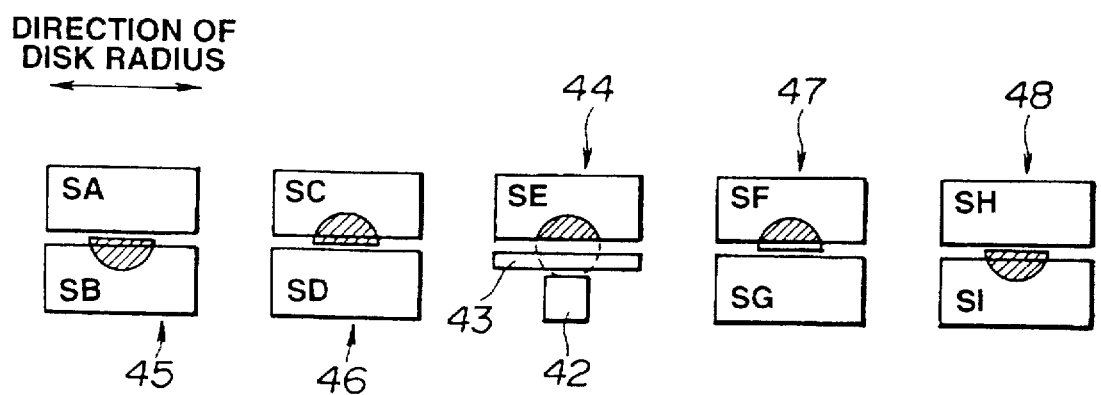
FIG. 6 shows the positional relation of photodetectors provided on a laser module of the optical pickup device shown in FIG. 4 and the state of radiation of the reflected light.

These photodetectors 44 to 48 are arranged side-by-side along the radius of the disc for receiving five reflected light portions split by a light polarizing hologram 51 in the movable unit 50, as shown in FIG. 6.

The movable unit 50 includes the polarizing hologram 51, functioning as a polarizing beam splitter, a two-segment optical rotation plates 52 divided by a partitioning line extending along the radius of the disc passing through the optical axis into a right rotation plate 52R and a left rotation plate 52L, and an objective lens 53. The polarizing hologram 51 and the two-segment optical rotation plate 52 are of a disc shape of the same diameter and bonded together to form a unitary structure. The objective lens 53 is of the same diameter as the polarizing hologram 51 and the two-segment optical rotation plate 52 and are layered along with the polarizing hologram 51 and the two-segment optical rotation plate 52 within a cylindrically-shaped holder 54.

The polarizing hologram 51 operates as a polarizing beam splitter for directly transmitting the incident light of the P-polarized components therethrough and for radiating the incident light of the S-polarized component having the direction of light polarization thereof perpendicular to the P-polarized component along a light path different from the light path of the incident light. The polarizing hologram 51 is divided into two along a partition line extending along the radius of the disc through the optical axis. The optical hologram 51 has an area 51A in register with the right rotation plate 52R and an area 51B in register with the left rotation plate 52R. In these areas 51A and 51B are formed a planar hologram in the form of a diffractive lattice having a coarser lattice spacing and a planar hologram in the form of a diffractive lattice having a denser lattice spacing, respectively.

The right rotation plate 52R rotates the incident light a pre-set angle α, herein 22.5°, towards right as seen from the outgoing side, and radiates the thus rotated light. The left rotation plate 52R rotates the incident light a pre-set angle α, herein 22.5°, towards left as seen from the outgoing side, and radiates the thus rotated light.

The movable unit 50 is driven under control by the servo control circuit 36 on the basis of the tracking error signal THE and a focusing error signal FE.

The movable unit 50 radiates the outgoing light of the laser module 41, incident thereon via the polarizing hologram 51 and the two-segment optical rotation plate 52, on the optical disc 33 as a converging light beam by the objective lens 53. The reflected light by the optical disc 33 is split from the objective lens 53 via the two-segment optical rotation plate 52 and the polarizing hologram 51 into light portions proceeding along five light paths. These light portions fall on the laser module 41.

The first photodetector 44 of the laser module 41 is provided on the back side of the reflective mirror 43, as shown in FIG. 6. The first photodetector 44 is configured for receiving, by a light receiving portion SE, about one-half of the O-order light component of the reflected light which is illuminated thereon without being changed in its light path by the light polarizing hologram 51.

Each of the second to fourth photodetectors 45 to 48 is a two-segment photodetector divided along a partition line extending along the radius of the disc with an interval of, for example, 1 to 2 μm.

The second photodetector 45 receives the +one order diffracted light component from the left rotation plate 52L split by the polarizing hologram 51 by light receiving areas SA and SB. The third photodetector 46 receives the +one order diffracted light component of the reflected light from the left rotation plate 52R split by the polarizing hologram 51 by light receiving areas SC and SD. The fourth photodetector 47 receives the −one order diffracted light component of the reflected light from the left rotation plate 52R split by the polarizing hologram 51 by light receiving areas SF and SG. The fifth photodetector 48 receives the −one order diffracted light component from the left rotation plate 52L split by the polarizing hologram 51 by light receiving areas SH and SI.

In the above-described optical pickup device, the laser module 41 radiates a laser beam of the P-polarized light component from the laser diode 42 as an outgoing light in a direction parallel to the optical disc 33. This outgoing light is reflected by the reflective mirror 43, having an angle of reflection of 45°, in a direction perpendicular to the magneto-optical disc 7, so as to fall on the movable unit 50.

Figure 7:
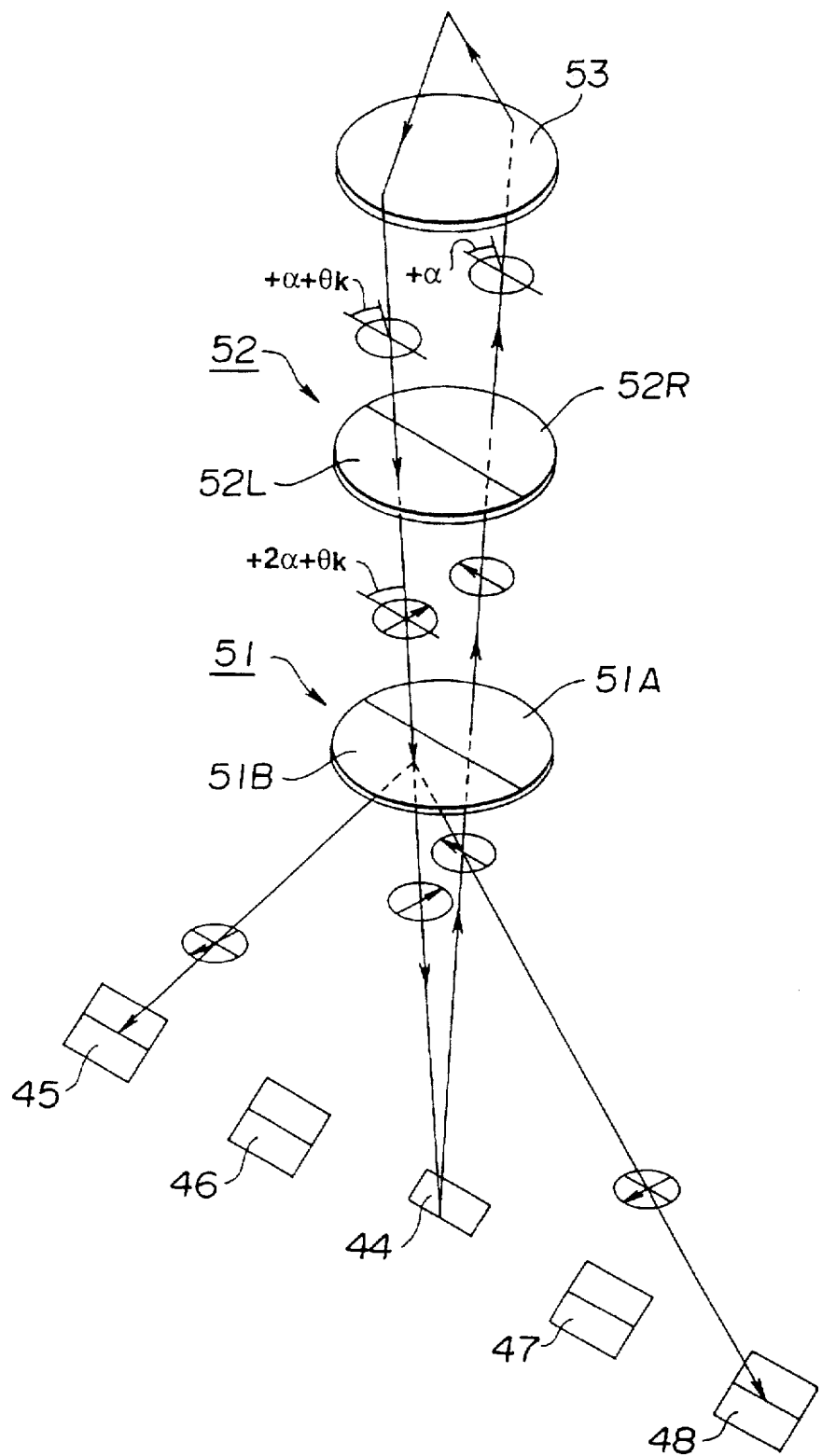
FIG. 7 illustrates the state of optical rotation of an outgoing light from the laser module having passed through a right rotation plate of a two-segment optical rotating plate provided on a movable unit of the optical pickup device shown in FIG. 4.
Figure 8:
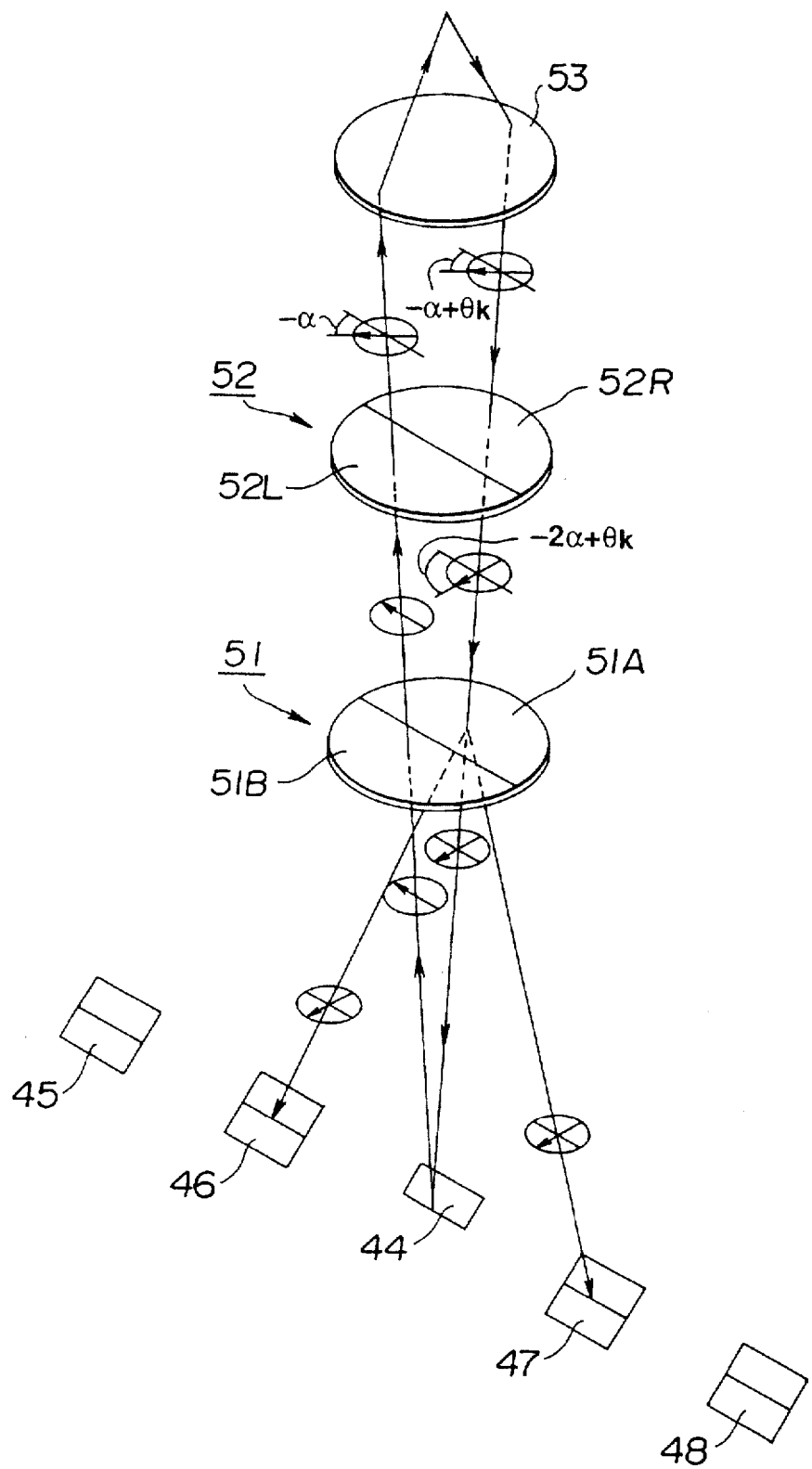
FIG. 8 illustrates the state of optical rotation of an outgoing light from the laser module having passed through a left rotation plate of the two-segment optical rotation plate.

The outgoing light of the laser module 41 is incident on the two-segment optical rotation plate 52 via the light polarizing hologram 51 configured for directly transmitting the P-polarized light component. In the outgoing light of the laser module 41, the light components transmitted through the right rotation plate 52R of the two-segment optical rotation plate 52 are rotated 22.5° towards right as seen from the objective lens 53, as shown in FIG. 7, while the light components transmitted through the left rotation plate 52L of the two-segment optical rotation plate 52 are rotated 22.5° towards left as seen from the objective lens 53, as shown in FIG. 8.

These light components of the outgoing light, thus rotated by the two-segment optical rotation plate 52, are condensed by the objective lens 53 so as to be illuminated on the magneto-optical disc 33.

The outgoing light radiated on the magneto-optical disc 33 by the objective lens 53 is reflected by the magneto-optical disc 33. The outgoing light components, rotated towards right and towards left as described above, are reflected as they are rotated by an angle θk towards right and towards left, respectively, by the Kerr effect, in accordance with data recorded on the magneto-optical disc 33.

This reflected light then falls via the objective lens 53 on the two-segment optical rotation plate 52. The components transmitted through the right rotation plate 52R in the state of the outgoing light are incident on the left rotation plate 52L in the state of the reflected light, while the components transmitted through the left rotation plate 52L in the state of the outgoing light are incident on the right rotation plate 52R in the state of the reflected light. The reflected light incident on the left rotation plate 52L is radiated as it is thereby rotated further by 22.5° towards left as seen from the laser module 41, while the reflected light incident on the right rotation plate 52R is radiated as it is thereby rotated further by 22.5° towards right as seen from the laser module 41.

Thus the reflected light outgoing from the left rotation plate 52L is radiated as it is rotated −45°+θk (−22.5°−22.5°+θk (data component)=−45°+θk) towards left, as viewed from the laser module 41, with respect to the outgoing light incident on the right rotation plate 52R. On the other hand, the reflected light outgoing from the right rotation plate 52R is radiated as it is rotated 45°+θk (22.5°+22.5°+θk (data component)=45°+θk) towards left, as viewed from the laser module 41, with respect to the outgoing light incident on the left rotation plate 52L.

The reflected light, rotated in different directions by the two-segment optical rotation plate 52, falls on the light polarizing hologram 51.

Since the reflected light has been rotated ±45°+θk towards right or left as seen from the laser module 41, it has both P-polarized light components and S-polarized light component. It is noted that the light polarizing hologram 51, radiating the S-polarized light components after bending its light path a pre-set angle, as described above, has such characteristics that the light of the S-polarized light components rotated towards right as seen from the laser module 41 is radiated along a light path bent towards left, while the light of the same S-polarized light components rotated towards left as seen from the laser module 41 is radiated along a light path bent towards right.

The reflected light transmitted through the left rotation plate 52L has the S-polarized component, rotated towards right as seen from the laser module 41. Thus the reflected light has its light path bent a pre-set angle towards left by the area 51B of the light polarizing hologram 51 with dense diffraction lattice, so that its +one order diffracted light component and −one order diffracted light component are radiated on the second photodetector 45 and the fifth photodetector 48 of the laser module 41, respectively. On the other hand, the reflected light transmitted through the right rotation plate 52R has the S-polarized component, rotated towards left as seen from the laser module 41. Thus the reflected light has its light path bent a pre-set angle towards right by the area 51A of the light polarizing hologram 51 with coarse diffraction lattice, so that its +one order diffracted light component and −one order diffracted light component thereof are radiated on the third photodetector 46 and the fourth photodetector 47 of the laser module 41, respectively.

The reflected light of the P-polarized light components, transmitted through the light polarizing hologram 20, is radiated on the first photodetector 44 with its light path remaining unchanged.

Under the just-focus state, the photodetectors 44 to 48 receive the reflected light portions as points produced by beam spots representing the limit of diffraction. However, in the far focus defocused state, in which the objective lens 53 approaches to the optical disc 33, the light receiving area SB of the second photodetector 45, the light receiving area SC of the third photodetector 46, the light receiving areas SF of the fourth photodetector 47 and the light receiving areas SI of the fifth photodetector 48 receive crescent-shaped reflected light portions, as shown in FIG. 6. In the near-focus defocused state in which the objective lens 53 is moved away from the optical disc 33, it is the light receiving area SA of the second photodetector 45, the light receiving area SD of the third photodetector 46, the light receiving areas SG of the fourth photodetector 47 and the light receiving areas SH of the fifth photodetector 48 that receive crescent-shaped reflected light portions.

Figure 9:
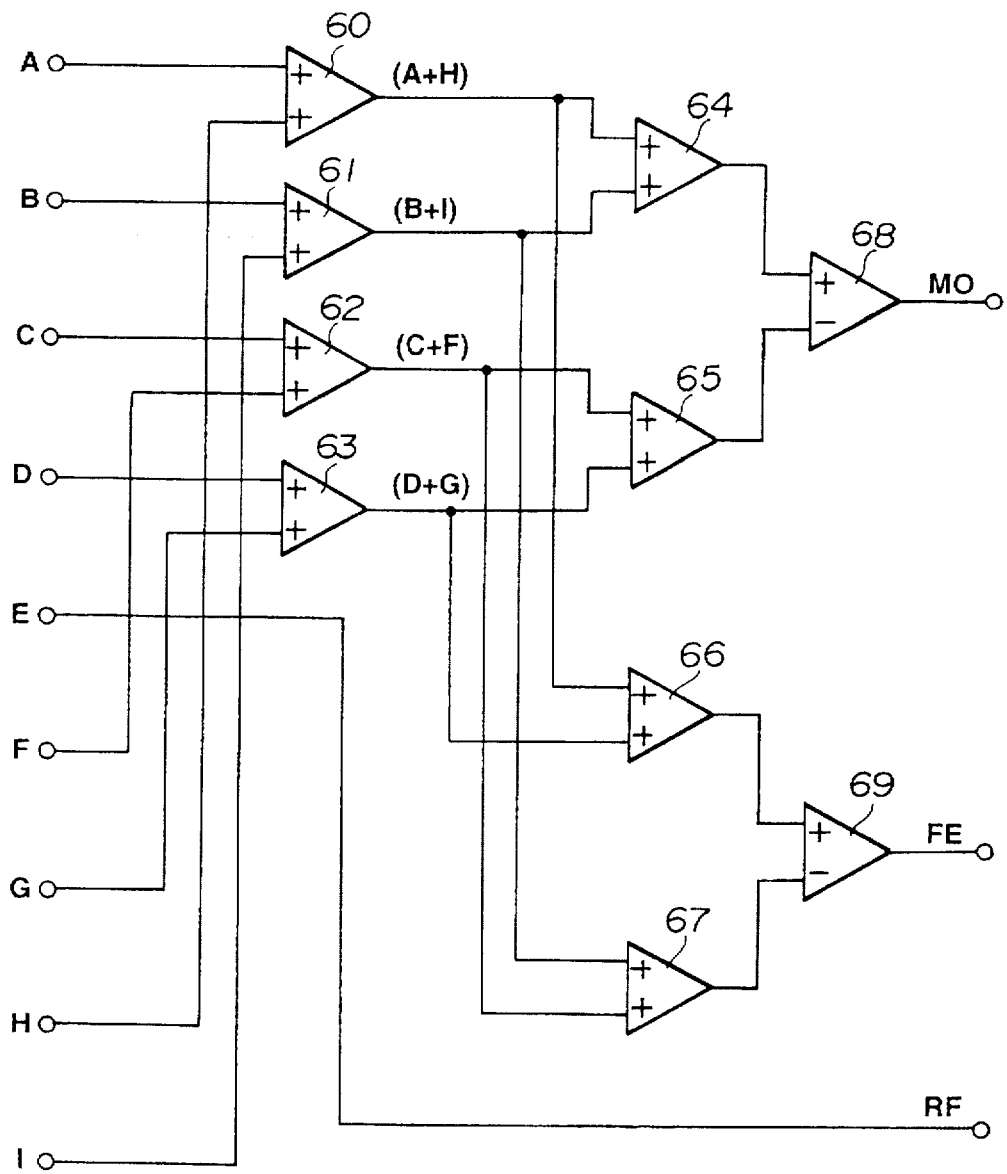
FIG. 9 illustrates an illustrative structure of a signal detection circuit in the optical pickup device shown in FIG. 4.

The photodetectors 44 to 48 supply detection signals A to I of signal levels corresponding to the light volume of the reflected light received by the light receiving areas SA to SI to a signal detection circuit configured as shown in FIG. 9.

The signal detection circuit has eight adders 60 to 67 and two subtractors 68 and 69.

The adder 60 sums detection signals A and H obtained by the light receiving areas SA and SH of the second and fifth photodetectors 44, 48, respectively. The sum signal A+H by the adder 60 is supplied to the adders 64 and 66.

The adder 61 sums detection signals B and I obtained by the light receiving areas SB and SI of the second and fifth photodetectors 44, 48, respectively. The sum signal B+I by the adder 61 is supplied to the adders 64 and 66.

The adder 62 sums detection signals C and F obtained by the light receiving areas SC and SF of the third and fourth photodetectors 45, 47, respectively. The sum signal C+F by the adder 62 is supplied to the adders 65 and 67.

The adder 63 sums detection signals D and G obtained by the light receiving areas SD and SG of the third and fourth photodetectors 45, 47, respectively. The sum signal D+G by the adder 63 is supplied to the adders 65 and 67.

The adder 64 sums the sum signal A+H by the adder 60 to the sum signal B+I by the adder 61. The resulting sum signal A+H+B+I by the adder 64 is supplied to the subtractor 68.

The adder 65 sums the sum signal C+F by the adder 62 to the sum signal D+G by the adder 63. The resulting sum signal C+F+D+G by the adder 65 is supplied to the subtractor 68.

The adder 66 sums the sum signal A+H by the adder 60 to the sum signal D+G by the adder 63. The resulting sum signal A+H+D+G by the adder 66 is supplied to the subtractor 69.

The adder 67 sums the sum signal B+I by the adder 61 to the sum signal C+F by the adder 62. The resulting sum signal B+I+C+F by the adder 67 is supplied to the subtractor 69.

The subtractor 68 subtracts the sum signal C+F+D+G from the sum signal A+H+B+I by the adder 64. The subtraction signal (A+H+B+I)−(C+F+D+G) represents a playback MO signal.

The subtractor 69 subtracts the sum signal B+I+C+F from the sum signal A+H+D+G by the adder 68. The subtraction signal (A+H+D+G)−(B+I+C+F) represents the focusing error signal FE.

The signal detection circuit outputs a detection signal E obtained from the light receiving area SE of the first photodetector 44 directly as the playback RF signal.

That is, the signal detection circuit generates $FE=(A+H+D+G)-(B+I+C+F)$ $MO=(A+H+B+I)-(G+D+F+C)$ $RF=E$ based upon the detection signals A to I of signal levels corresponding to the light volumes of the reflected light received by the light receiving areas SA to SI of the photodetectors 44 to 48.

The servo control circuit 36 of the recording/reproducing apparatus effectuates focusing control by driving the movable unit 50 in a direction of correcting the defocusing based upon the focusing error signals FE supplied from the signal detection circuit. The playback MO signals or playback RF signals are decoded by the signal processing circuit 38 to produce playback signals which are transmitted to an externally connected computer or speaker.

Figure 10:
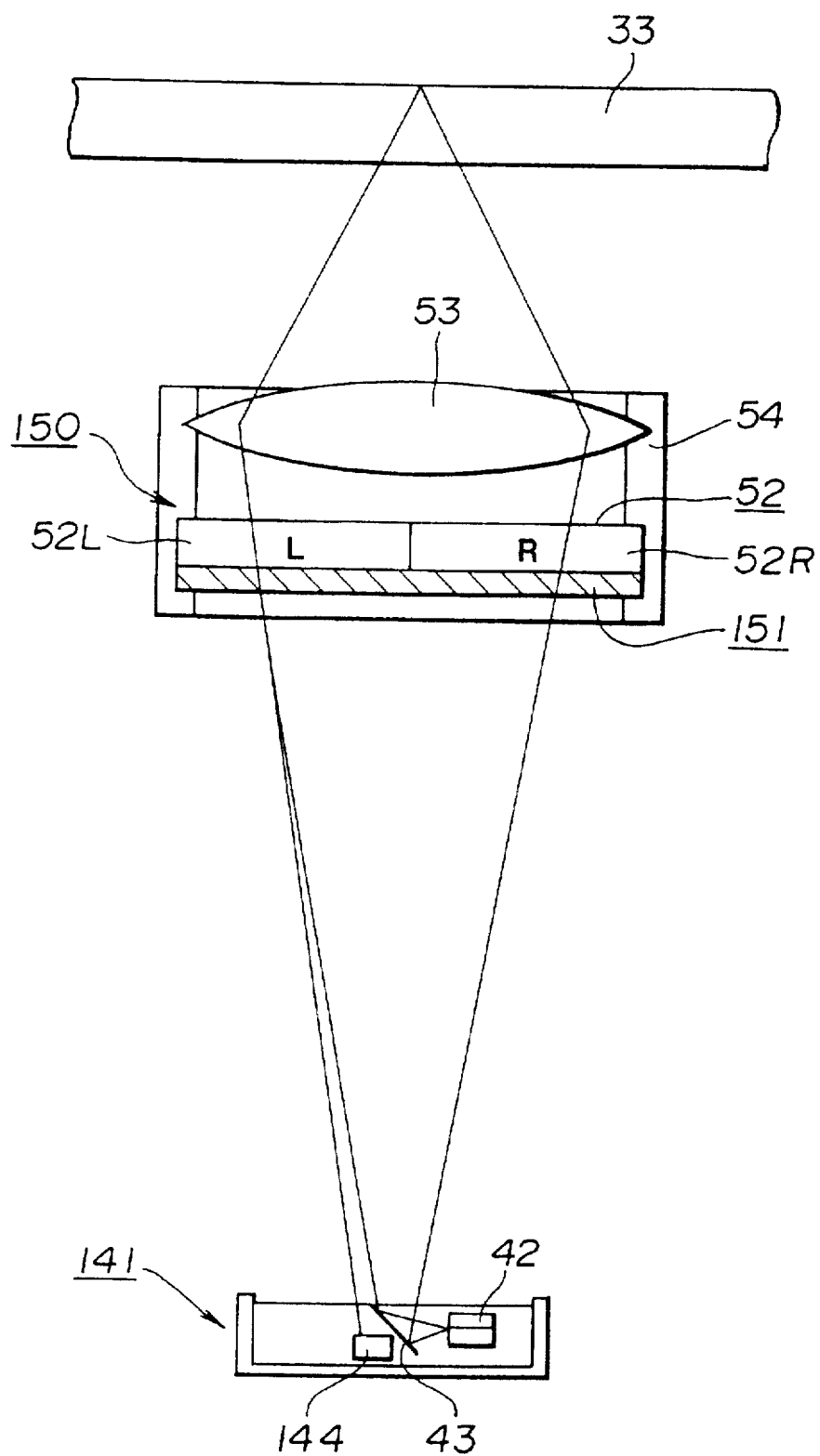
FIG. 10 illustrates another typical structure of an optical pickup device of the present invention employed in the above optical disc driving apparatus.
Figure 11:
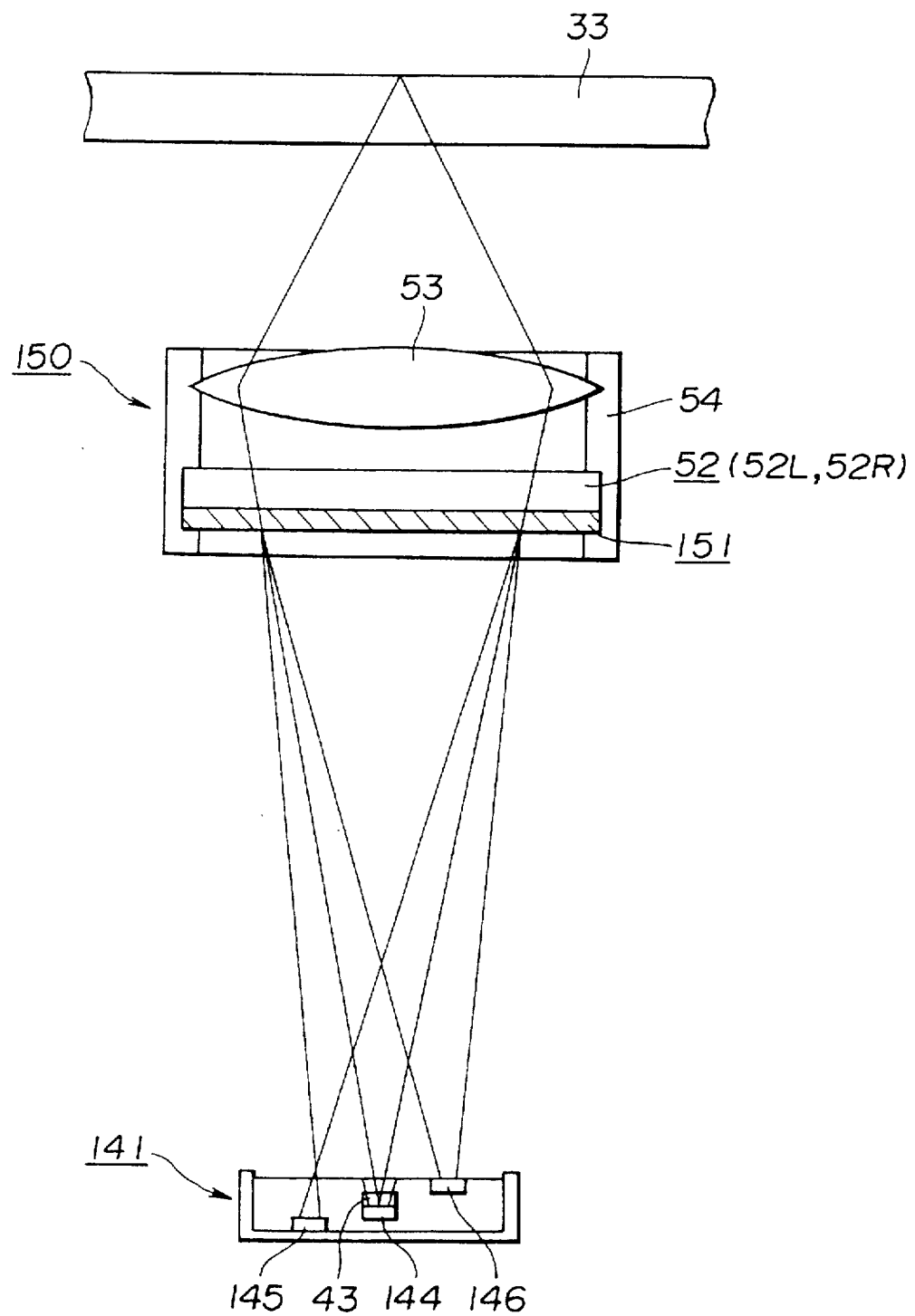
FIG. 11 illustrates the state of separation of a reflected light by a light polarizing hologram provided on a movable unit of the optical pickup device shown in FIG. 10.

The optical pickup device according to the present invention is comprised of a laser module 141 and a movable unit 150, as shown for example in FIGS. 10 and 11.

Figure 4:
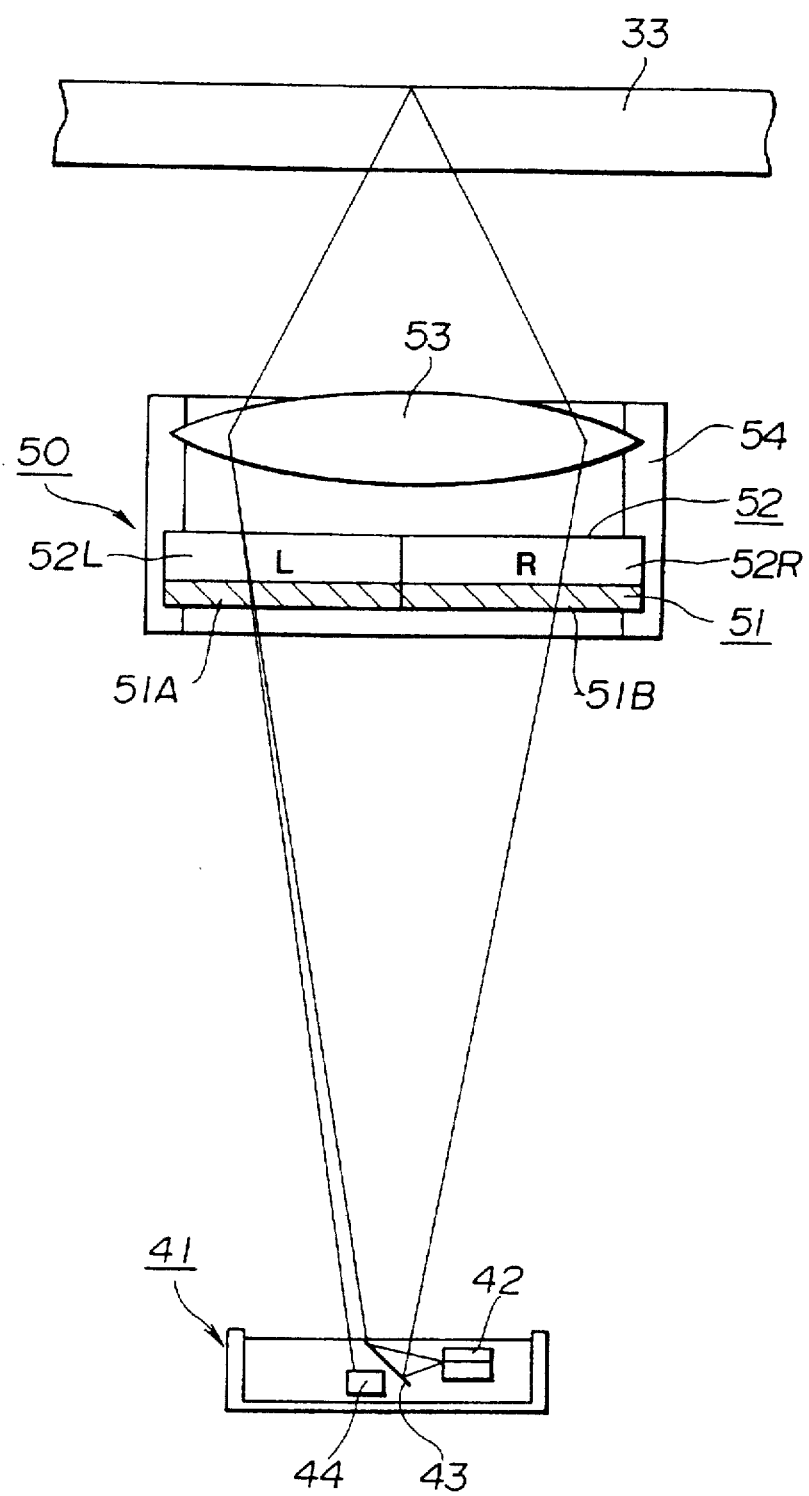
FIG. 4 illustrates a typical structure of am optical pickup device of the present invention employed in the above optical disc driving apparatus.
Figure 5:
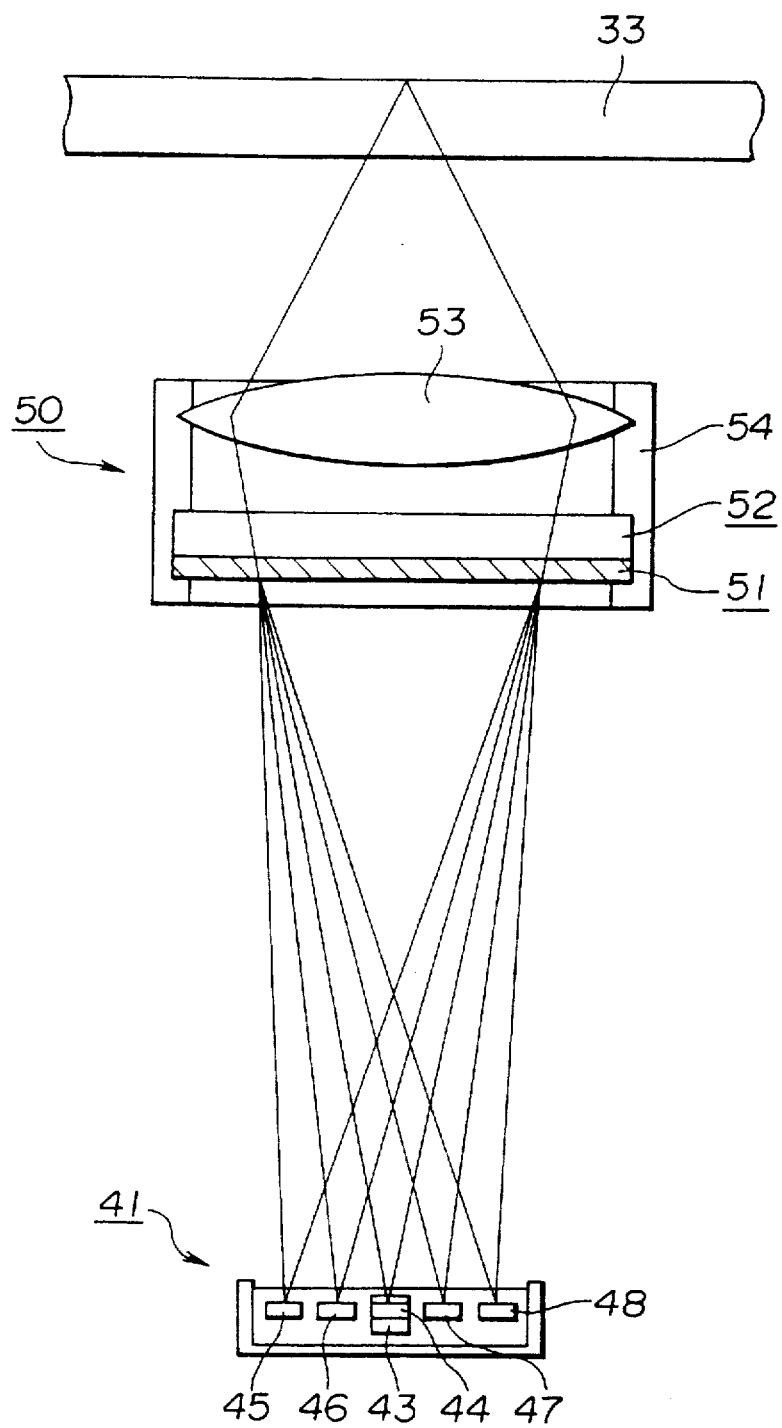
FIG. 5 illustrates the state of separation of a reflected light by a light polarizing hologram provided on a movable unit of the optical pickup device shown in FIG. 4.

The present optical pickup device differs from the optical pickup device shown in FIGS. 3 and 4 as to the polarizing hologram 151 in the movable unit 150 and as to the first to third photodetectors 144 to 146 in the laser module 141, while the remaining components are the same as those of the optical pickup device shown in FIGS. 3 and 4. Therefore, the components of the present optical pickup device are denoted by the same reference numerals and the corresponding description is omitted for clarity.

With the present optical pickup device, a planar hologram in the form of a diffractive lattice having a uniform lattice interval is formed on the entire area of the light polarizing hologram 151 in the movable unit 150, for splitting the reflected light passed through the two-segment optical rotation plate 52 into three light portions, namely a 0-order diffracted light component and ±one order diffracted light components.

The first to third photodetectors 144 to 146 in the laser module 141 are provided in different heights, so that, when the first photodetector 144 receives the 0-order diffracted light component of the reflected light from the movable unit 150 under the just-focus state, the second photodetector 145 receives the +one order diffracted light component under the near-focus state, while the third photodetector 146 receives the −one order diffracted light component under the far-focus state, with the second and third photodetectors 145, 146 receiving the same amount of light.

Figure 12A:
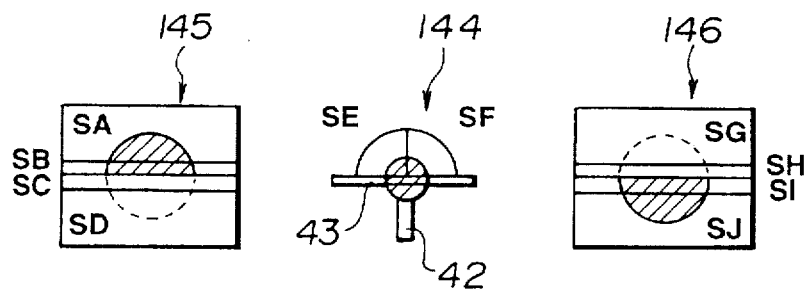
FIG. 12 shows the positional relation of photodetectors provided on a laser module of the optical pickup device shown in FIG. 10 and the state of radiation of the reflected light.
Figure 12B:
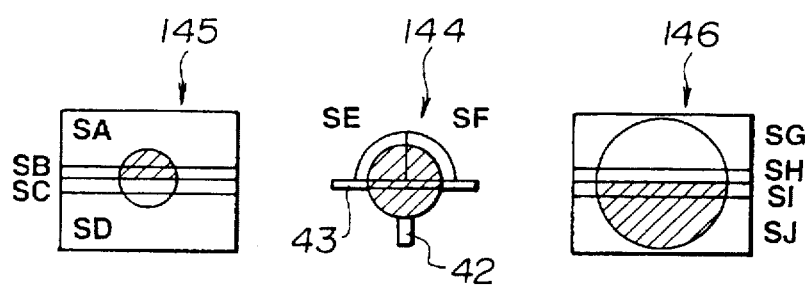
Figure 12C:
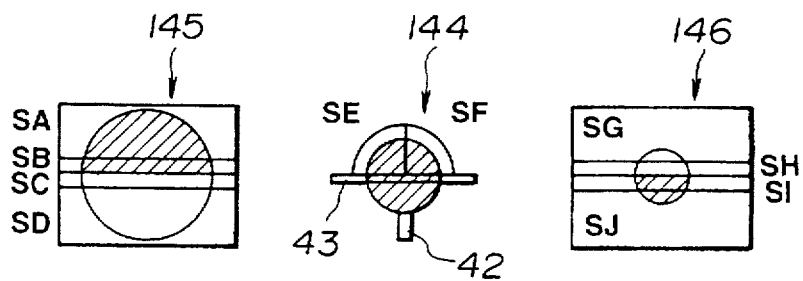

The first photodetector 144 in the laser module 141 is designed as a two-segment photodetector, with a partitioning line extending in a direction perpendicular to the radial direction of the disc, as shown in FIG. 12. The first photodetector 144 is configured for receiving about one-half of the 0-order light component, radiated by the polarizing hologram 151 without being changed as to light path, by light receiving areas SE and SF.

Each of the second and third photodetectors 145, 146 is a four-segment photodetector, with partitioning lines extending along the radial direction of the disc.

The second photodetector 145 receives +one order diffracted light component of the reflected light, split by the light polarizing hologram 151, by light receiving areas SA, SB, SC and SD. The third photodetector 146 receives −one order diffracted light component of the reflected light, split by the light polarizing hologram 151, by light receiving areas SG, SH, SI and SJ.

With the above-described optical pickup device, the following arithmetic operations are executed by a signal detection circuit comprised of adders and subtractors on the basis of detection signals A to J of signal levels corresponding to light volume of the reflected light received by light receiving areas SA to SJ of the photodetectors 144 to 146 for producing playback MO signals, focusing error signals FE, playback RF signals and push-pull signals PP.

That is, the playback MO signals and the focusing error signals FE may be produced, from the detection signals A to D and G to J by the photodetectors SA to SD and SG to SJ of the second and third photodetectors 145 and 146, respectively receiving the +one order diffracted light component and −one order diffracted light component, in accordance with an arithmetic operation:

$$MO=(A+B+I+J)-(C+D+G+H)$$

and in accordance with an arithmetic operation:

$$FE=(A+D+H+I)-(B+C+G+J)$$

respectively.

The playback RF signals and the tracking error signals THE may be produced from detection signals E and F of the light receiving sections SE and SF of the first photodetector 144 receiving the O-order diffracted light component of the reflected light in accordance with an arithmetic operation:

$$RF=E+F$$

and in accordance with an arithmetic operation:

$$THE=E-F$$

The playback RF signals may also be produced from the detection signals A to J by the light receiving areas SA to SJ of the photodetectors 144 to 146 in accordance with an arithmetic operation:

$$RF=A+B+C+D+E+F+G+H+I+J$$

Figure 13:
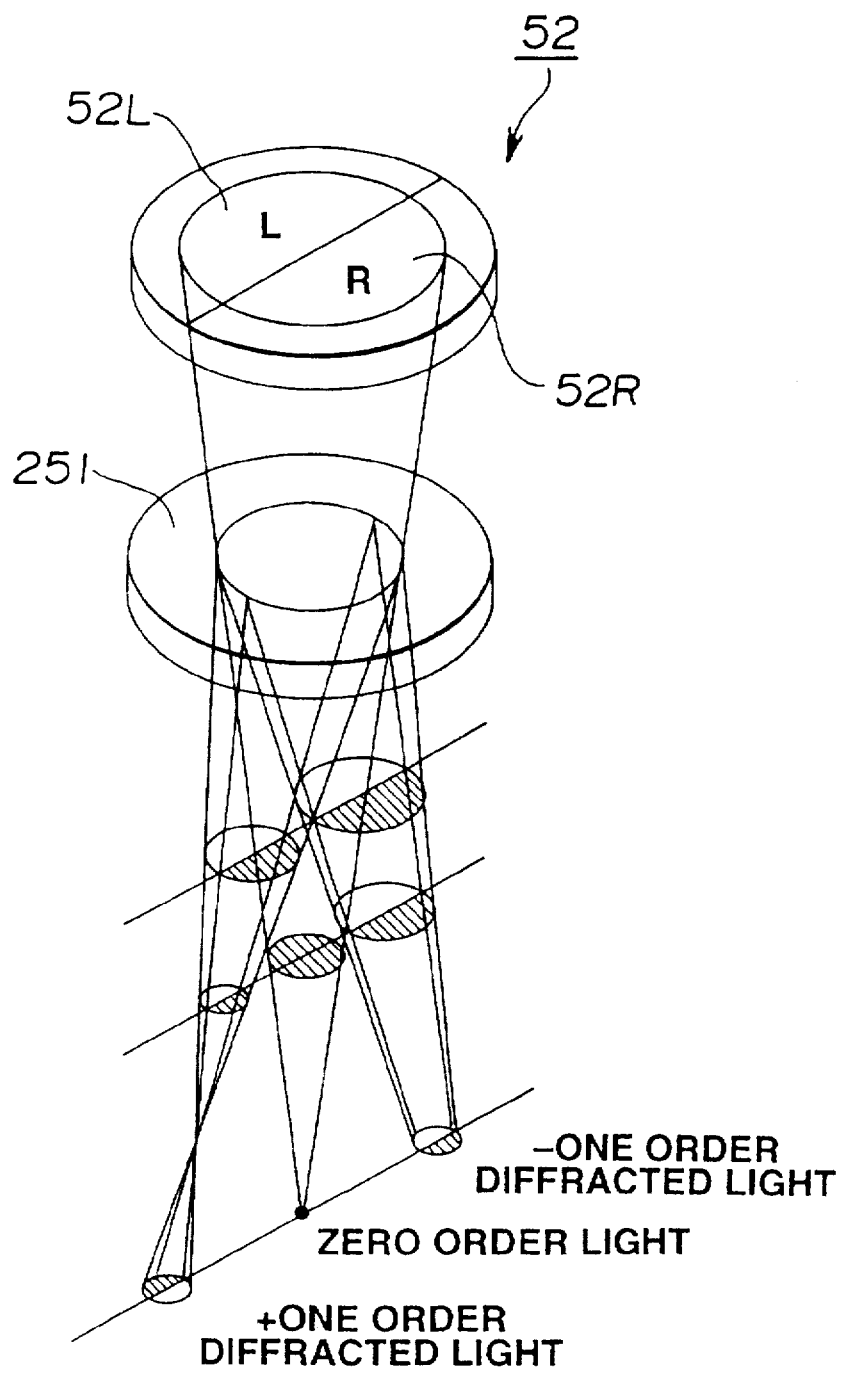
FIG. 13 illustrates yet another typical structure of an optical pickup device of the present invention employed in the above optical disc driving apparatus.
Figure 14:
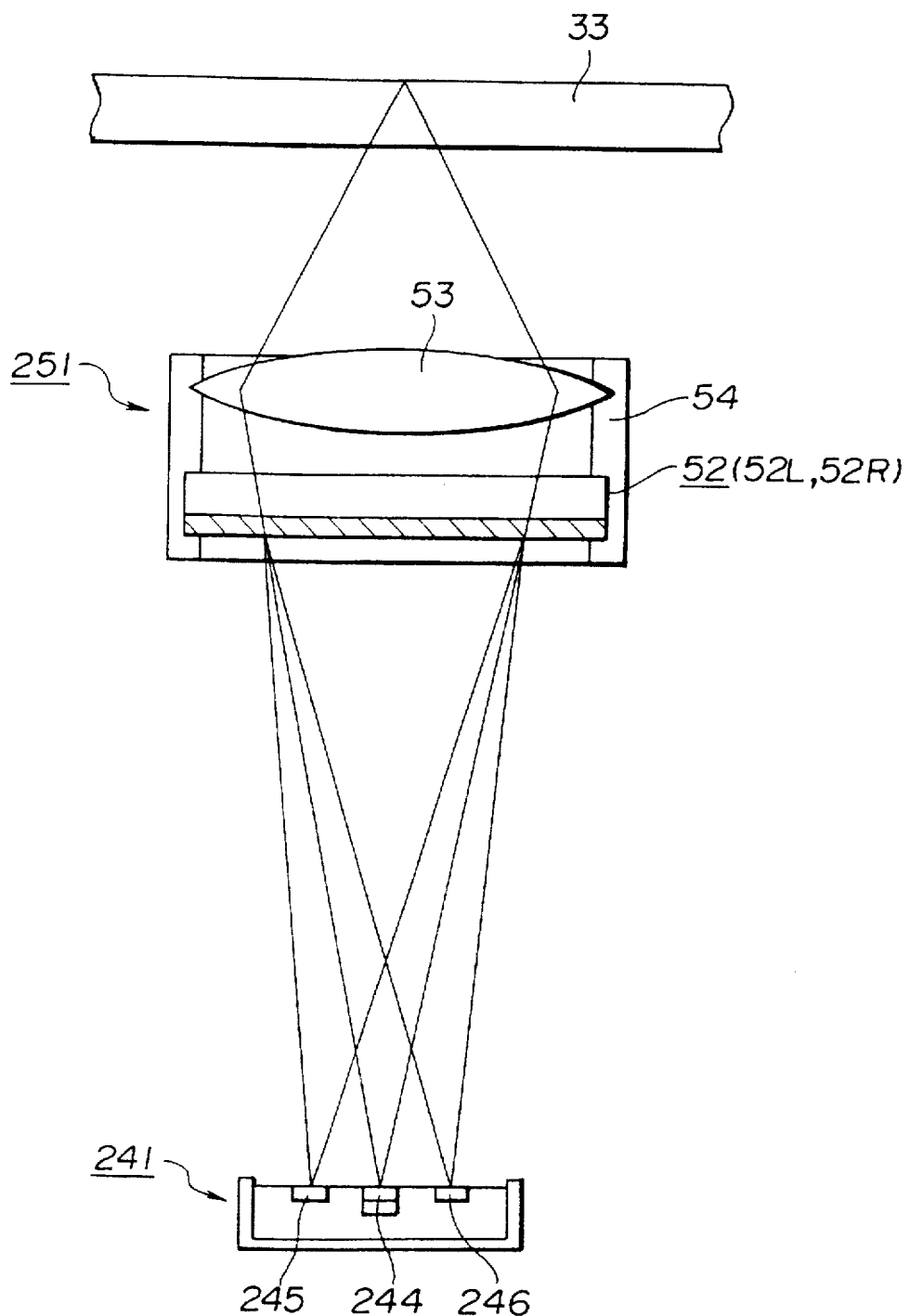
FIG. 14 illustrates the state of separation of the reflected light by the polarizing hologram provided in a movable unit of the optical pickup device shown in FIG. 13.

The optical pickup device according to the present invention is comprised of a laser module 241 and a movable unit 250, as shown for example in FIGS. 13 and 14.

The present optical pickup device differs from the optical pickup device shown in FIGS. 11 and 12 as to the polarizing hologram 251 in the movable unit 250 and as to the first to third photodetectors 244 to 246 in the laser module 241, while the remaining components are the same as those of the optical pickup device shown in FIGS. 11 and 12. Therefore, the components of the present optical pickup device are denoted by the same reference numerals and the corresponding description is omitted for clarity.

That is, the light polarizing hologram 251 in the movable unit 250 of the present optical pickup device, configured for splitting the reflected light passed through the two-segment optical rotation plate 52, into the O-order diffracted light component and ±one order diffracted light component, has a focal point for the +one order diffracted light component different from a focal point for the −one order diffracted light component. It is noted that the first to third photodetectors 244 to 246 in the laser module 241 are arranged on one and the same plane. However, an arrangements so made that, when the first photodetector 244 receives the O-order diffracted light component of the reflected light from the movable unit 250 under the just-focus state, the second photodetector 245 receives the +one order diffracted light component under the near-focus state and the third photodetector 246 receives the −one order diffracted light component under the far-focus state, with the second and the third photodetectors 245, 246 receiving the same amount of light.

Figure 15:
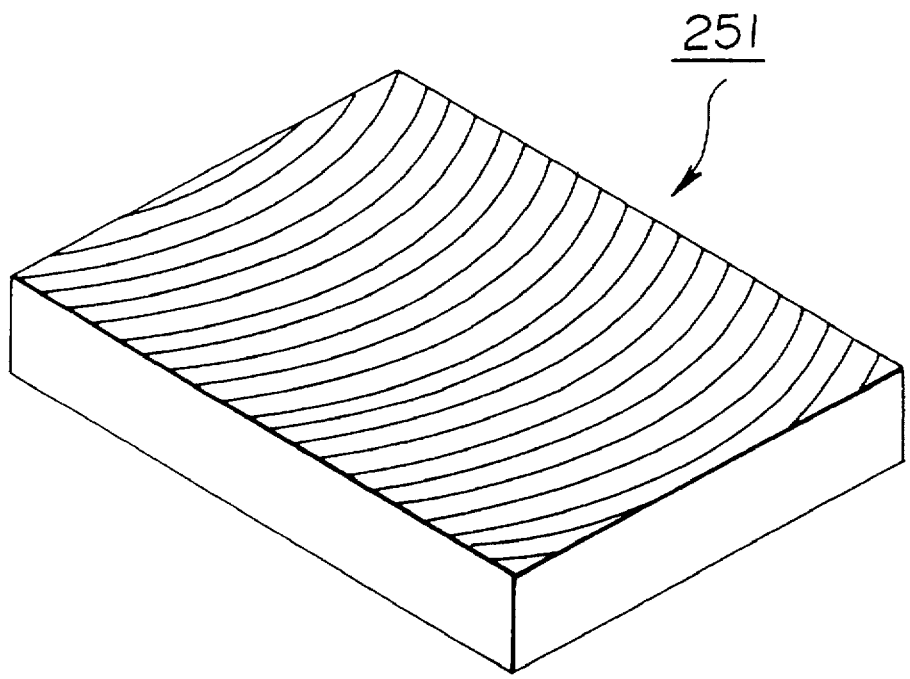
FIG. 15 shows the positional relation of photodetectors provided on a laser module of the optical pickup device shown in FIG. 12 and the state of radiation of the reflected light.

The light polarizing hologram 251 forms a substantially planar hologram in the shape of a diffraction lattice having a curvature, for providing a focal point for the +one order diffracted light component and a focal point for the −one order diffracted light component different from each other, as shown schematically in FIG. 15.

The first photodetector 244 in the laser module 241 is a two-segment photodetector with a partitioning line extending along a direction perpendicular to the radial direction of the disc. The first photodetector 244 is designed to receive about one-half of the O-order light component, radiated thereto without having its light path changed by the light polarizing hologram 251, by its respective light receiving areas.

Each of the second and third photodetectors 245, 246 is a four-segment photodetector, with respective partitioning lines extending along the radial direction of the disc.

The second photodetector 245 receives +one order diffracted light components of the reflected light split by the light polarizing hologram 251 by respective light receiving areas. The third photodetector 245 receives −one order diffracted light components of the reflected light split by the light polarizing hologram 251 by respective light receiving areas.

With the above-described optical pickup device, the signal detection circuit executes arithmetic operations similar to those executed by the optical pickup device shown in FIGS. 11 and 12, based upon detection signals A to J of signal levels corresponding to the light volume of the reflected light received by the light receiving areas of the photodetectors 244 to 246, for producing playback MO signals, focusing error signals FE, playback MO signals and the tracking error signals THE.

That is, the playback MO signals and the focusing error signals may be produced, from the detection signals A to D and G to J by the respective light receiving sections of the second and third photodetectors 245, 246 receiving the +one order diffractive light components and −one order diffracted light components of the reflected light, in accordance with the following arithmetic operations:

$$MO=(A+B+I+J)-(C+D+G+H)$$

and $$FE=(A+D+H+I)-(B+C+G+H)$$

respectively.

On the other hand, the playback RF signals and the tracking error signals THE may be produced, from detection signals E and F of the respective light receiving sections of the first photodetector 244 receiving the O-order diffracted light component of the reflected light, in accordance with the arithmetic operations:

$$RF=E+F$$

$$THE=E-F$$

respectively.

Figure 16:
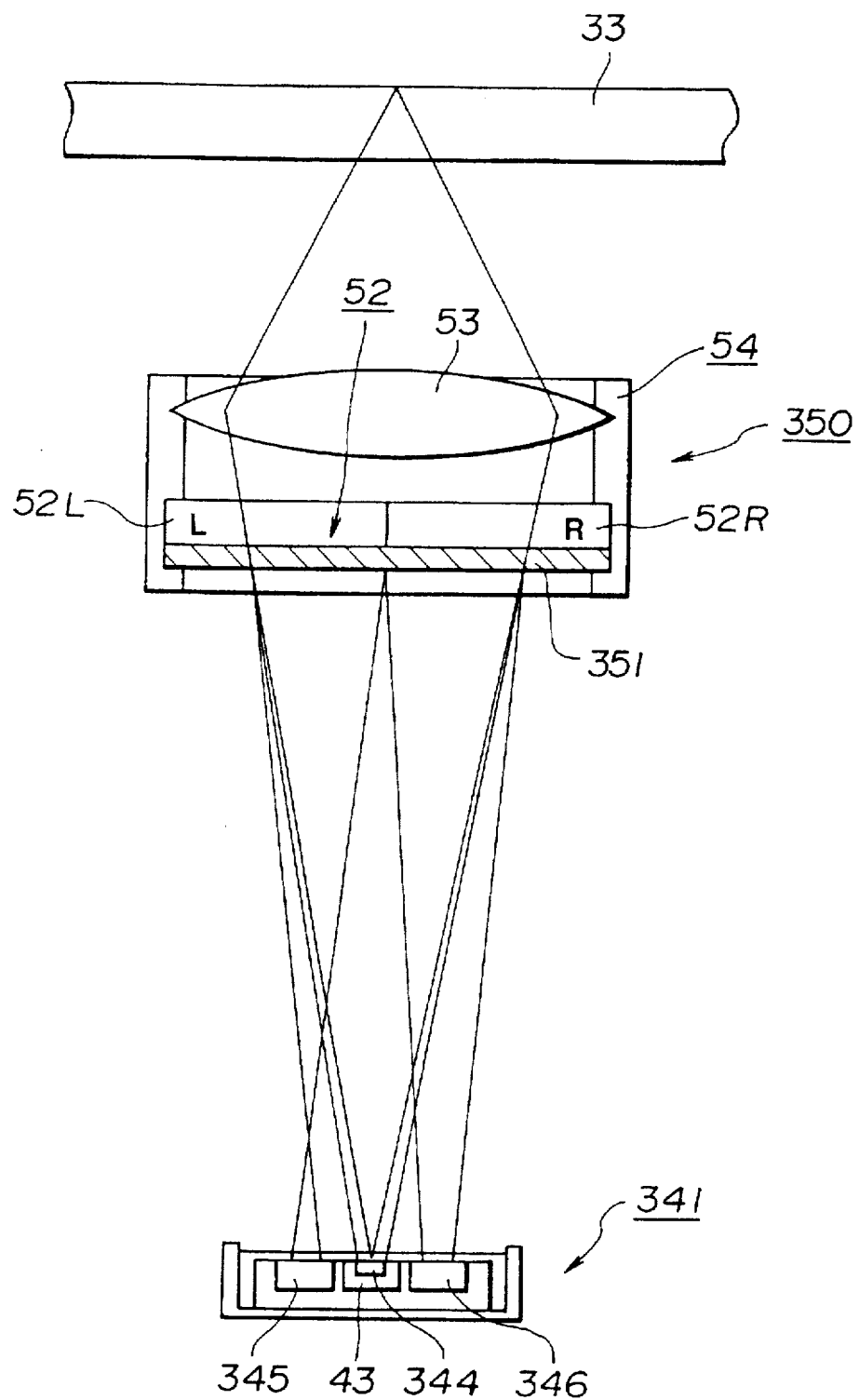
FIG. 16 illustrates a further typical structure of an optical pickup device of the present invention employed in the above optical disc driving apparatus.
Figure 17:
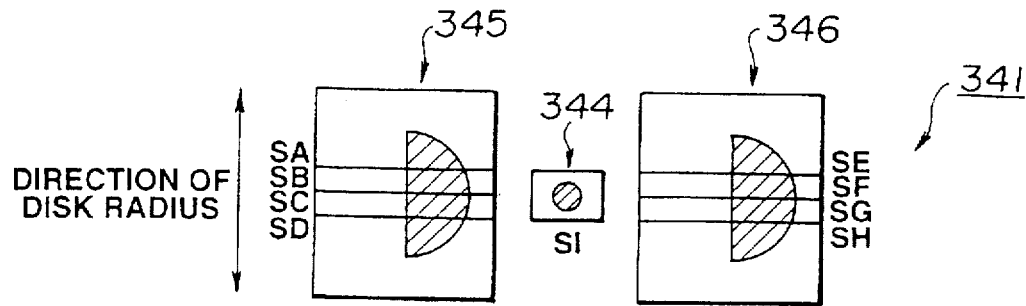
FIG. 17 shows the positional relation of photodetectors provided on a laser module of the optical pickup device shown in FIG. 16 and the state of radiation of the reflected light.

The optical pickup device according to the present invention is comprised of a laser module 341 and a movable unit 350, as shown for example in FIGS. 16 and 17.

The present optical pickup device differs from the optical pickup device shown in FIGS. 14 and 15 as to the polarizing hologram 351 in the movable unit 350 and as to the first to third photodetectors 344 to 346 in the laser module 341. However, since the remaining components are the same as those of the optical pickup device shown in FIGS. 14 and 15, the components of the present optical pickup device are denoted by the same reference numerals and the corresponding description is omitted for clarity.

That is, the light polarizing hologram 351 in the movable unit 350 of the present optical pickup device, configured for splitting the reflected light passed through the two-segment optical rotation plate 52, into the O-order diffracted light component and ±one order diffracted light component, has a focal point for the +one order diffracted light component different from a focal point for the −one order diffracted light component. It is noted that the first to third photodetectors 344 to 346 in the laser module 341 are arranged on one and the same plane. However, the arrangement is so made that, when the first photodetector 344 receives the O-order diffracted light component of the reflected light from the movable unit 350 under the just-focus state, the second photodetector 345 receives the −one order diffracted light component under the near-focus state and the third photodetector 346 receives the +one order diffracted light component under the far-focus state, with the second and the third photodetectors 345, 346 receiving the same amount of light.

The first photodetector has only a light receiving area SI and is configured for receiving the reflected light of the P-polarized light component. The second photodetector 345 has its light receiving area split into light receiving areas SA to SD along the radius of the disc for receiving the −one order diffracted light component of the reflected light of the S-polarized light component having passed through the left rotation plate 52L and having its light path bent by the light polarizing hologram 351. The third photodetector 346 has its light receiving area split into light receiving areas E to H along the radius of the disc for receiving the +one order diffracted light component of the reflected light of the S-polarized light component having passed through the right rotation plate 52R and having its light path bent by the light polarizing hologram 351.

With the optical pickup device, having above-described laser module 341, the focusing error signal, playback MO signal, tracking error signal THE and the playback RF signal may be produced, from the detection signals A to I of signal levels corresponding to the light volumes of the reflected light received by the light receiving areas SA to SI of the photodetectors 344 to 346 of the laser module 341, by executing the following arithmetic operations:

$$FE=(A+D+F+G)-(B+C+E+F)$$

$$MO=(A+B+C+D)-(E+F+G+H)$$

$$THE=(A+B+C+D)-(C+D+E+F)$$

$$RF=I$$

by the signal detection circuit comprised of adders and subtractors.

Figure 18:
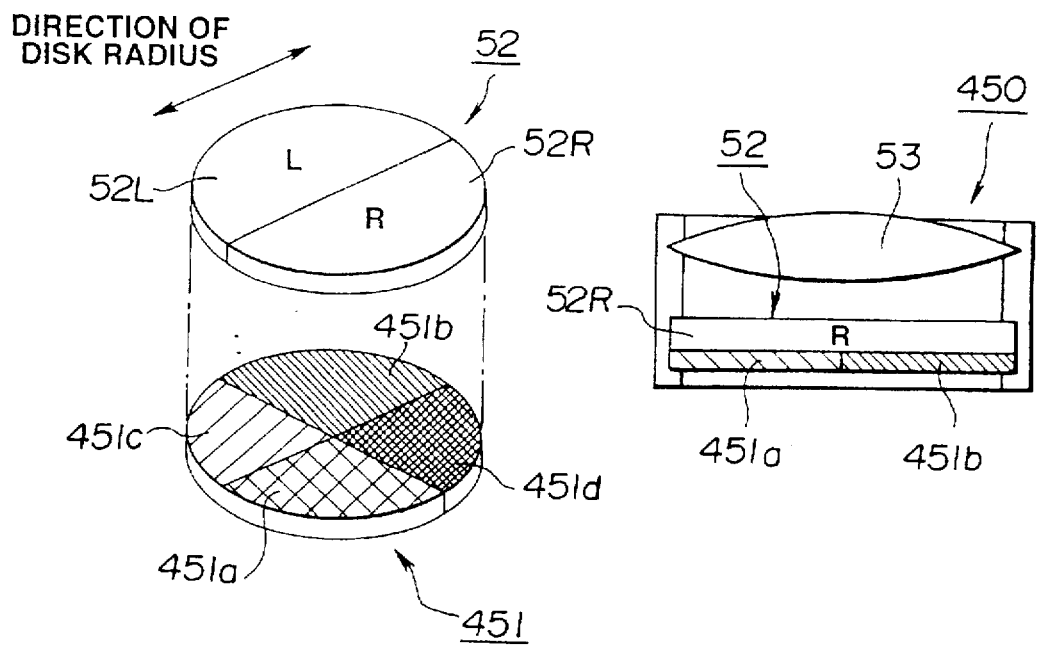
FIG. 18 illustrates the structure of a movable unit in the further structure of the optical pickup device of the present invention employed in the optical disc driving apparatus.
Figure 19B:
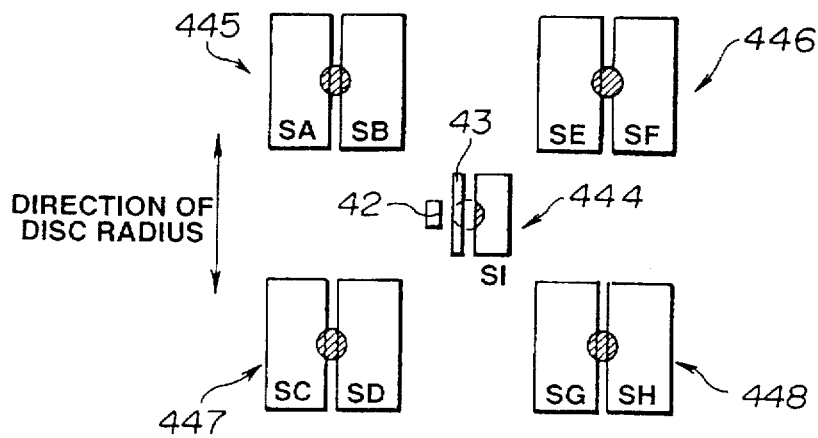
FIG. 19 illustrates the positional relation of a photodetector provided on a laser module constituting the optical disc driving apparatus of the present invention along with the movable unit shown in FIG. 18 and the state of radiation of the reflected light.
Figure 19B:
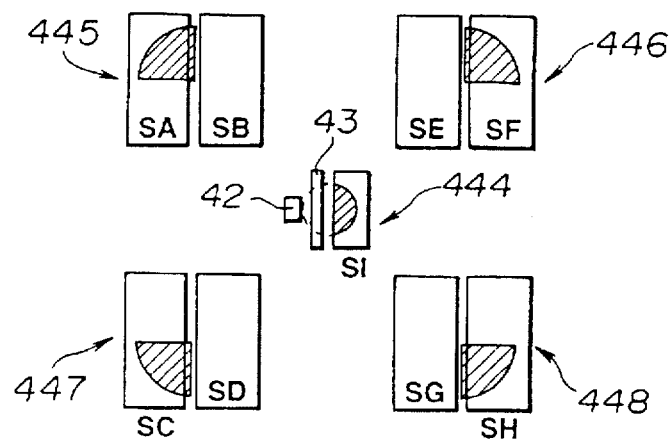

The optical pickup device according to the present invention is comprised of a movable unit 450, as shown for example in FIG. 18, and a laser module 441 as shown for example in FIG. 19.

The present optical pickup device differs from the optical pickup device shown in FIGS. 3 and 4 as to the polarizing hologram 451 in the movable unit 450 and as to the first to third photodetectors 444 to 448 in the laser module 441, while the remaining components are the same as those of the optical pickup device shown in FIGS. 14 and 15. Therefore, the components of the present optical pickup device are denoted by the same reference numerals and the corresponding description is omitted for clarity.

That is, in the present optical pickup device, the light polarizing hologram 451 in the movable unit 450, is divided into four areas, with a center angle each of 90°, in which four light polarizing hologram patterns, that is a first light polarizing hologram pattern 451a to a fourth light polarizing hologram pattern 451d, are formed, as shown in FIG. 18a.

The light polarizing hologram patterns, formed in the light polarizing hologram 451, are formed in adjacency to one another. Specifically, the first light polarizing hologram pattern 451a has characteristics of bending the light path of the reflected light of the S-polarized light component from the right rotation plate 52R of the two-segment optical rotation plate 52 towards left as seen from the laser module 441. The second light polarizing hologram pattern 451b has characteristics of bending the light path of the reflected light of the S-polarized light component from the right rotation plate 52R of the two-segment optical rotation plate 52 towards right as seen from the laser module 441. The third light polarizing hologram pattern 451c has characteristics of bending the light path of the reflected light of the S-polarized light component from the left rotation plate 52L of the two-segment optical rotation plate 52 towards left as seen from the laser module 441. In addition, the fourth light polarizing hologram pattern 451d has characteristics of bending the light path of the reflected light of the S-polarized light component from the left rotation plate 52L of the two-segment optical rotation plate 52 towards right as seen from the laser module 441.

On the other hand, the laser module 441 is provided with second to fifth photodetectors 445 to 448, centered about a first photodetector 444 configured for receiving the reflected light of the P-polarized light component, radiated along a light path unaffected by the light polarizing hologram 451, as shown in FIG. 19a.

The second to fifth photodetectors 445 to 448 have light receiving areas thereof split by splitting lines extending along the radius of the disc into respective two light receiving areas or portions, that is into light receiving areas SA and SB, light receiving areas SB and SC, light receiving areas light SC and SD and light receiving areas SG and SH, respectively. The first photodetector 444 has a light receiving area SI which is about one-half of the light receiving area of each of the photodetectors 445 to 448.

The first photodetector 445 is provided at a position of receiving the reflected light having its light path bent by the fourth light polarizing hologram pattern 451d of the light polarizing hologram 451. The second photodetector 446 is provided at a position of receiving the reflected light having its light path bent by the second light polarizing hologram pattern 451b. The third photodetector 447 is provided at a position of receiving the reflected light having its light path bent by the third light polarizing hologram pattern 451c. The fourth photodetector 448 is provided at a position of receiving the reflected light having its light path bent by the third light polarizing hologram pattern 451a.

With the above-described construction of the optical pickup device, the S-polarized light component of the reflected light, rotated towards left by the left rotation plate 52L of the two-segment rotation plate 52 as described above, is incident on the third and fourth light polarizing hologram patterns 451c, 451d of the light polarizing hologram 451, while the S-polarized light component of the reflected light, rotated towards right by the right rotation plate 52R of the two-segment rotation plate 52 as described above, is incident on the first and second light polarizing hologram patterns 451a, 451b of the light polarizing hologram 451.

The third light polarizing hologram pattern 451c bends the light path of the reflected light towards left as seen from the laser module 441 and radiates the light on the fourth photodetector 447. The fourth light polarizing hologram pattern 451d bends the light path of the reflected light towards right and radiates the light on the second photodetector 445. The first light polarizing hologram pattern 451a bends the light path of the reflected light towards left and radiates the light on the fifth photodetector 448. The second light polarizing hologram pattern 451b bends the light path of the reflected light towards right and radiates the light on the third photodetector 446.

The reflected light of the P-polarized light component, having passed through the two-segment rotation plate 52, is radiated on the first photodetector 444 without having its light path changed by the light polarizing hologram.

Figure 19C:
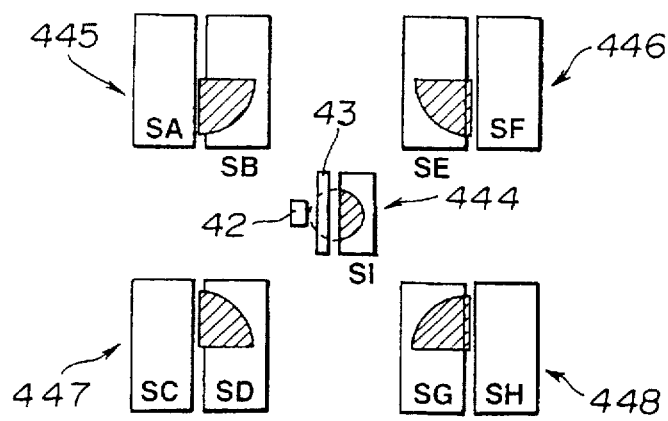

Specifically, the reflected light is radiated under the just-focus state as a point on each of the second to fifth photodetectors 445 to 448 as shown in FIG. 19a. However, under the near-focus defaces state in which the objective lens 53 is moved away from the optical disc 33, the reflected light is radiated in a sector shape in each of the light receiving area SA of the second photodetector 445, light receiving area SF of the third photodetector 446, the light receiving area SC of the fourth photodetector 447 and the light receiving area SH of the fifth photodetector 448, as shown in FIG. 19b. Under the far-focus defocused state in which the objective lens 53 is moved towards the optical disc 33, the reflected light is radiated in a sector shape in each of the light receiving area SB of the second photodetector 445, light receiving area SE of the third photodetector 446, light receiving area SD of the fourth photodetector 447 and the light receiving area SG of the fifth photodetector 448, as shown in FIG. 19c.

Meanwhile, the first photodetector 444 is irradiated with the reflected light of the P-polarized light component both under the near-focus and far-focus states over a wider area than under the just-focus state.

With the optical pickup device having the above-described construction of the laser module 441, the focusing error signal FE, playback MO signal, tracking error signal THE and the playback RG signal may be produced by executing, on the basis of the detection signals A to I of signal levels corresponding to the light volumes of the reflected light received by the light receiving areas AS to SI of the photodetectors 444 to 448, the following arithmetic operations:

$$FE=(B+D+E+G)-(A+C+F+H)$$

$$MO=(A+B+C+D)-(E+F+G+H)$$

$$THE=(A+B+E+F)-(C+D+G+H)$$

$$RF=I$$

by the signal detection circuit made up of adders and subtractors.

In the above-described embodiments, the right rotation plate 52R and the left rotation plate 52L of the two-segment light rotation plate 52 are deigned to rotate the outgoing light and the reflected light by 22.5°, respectively. However, this is merely illustrative and a variety of modifications inclusive of those of numerical figures may be made within the scope of the invention.

With the optical pickup device according to the present invention, it is unnecessary to provide a polarizing beam splitter or a beam splitter in the light path for extracting the reflected light so that the number of component parts may be diminished. Thus the overall optical path may be reduced and the construction simplified for reducing the production cost of the optical pickup device and an optical disc driving apparatus, such as a magneto-optical disc reproducing apparatus, employing the optical pickup device.

On the other hand, there is a relation of trade-off between the coupling efficiency and the S/N ratio, such that, if the coupling efficiency is to be improved, the S/N ratio is lowered and, conversely, if the S/N ratio is to be improved, the coupling efficiency is lowered. However, since the light polarizing hologram operates only in the stage of the reflected light, without operating on the outgoing light, a high coupling efficiency may be achieved. In addition, the three reflected light portions from the light polarizing hologram may directly be received substantially in their entirety by the photodetectors, so that a high S/N ratio may be achieved.

Since it suffices to control the position of the laser module for appropriately receiving the reflected light from the movable unit by the respective photodetectors, the optical pickup device may be easily assembled or adjusted in its mounting position.

Since the movable unit in its entirety is driven responsive to the focusing error signal or tracking error signals, the focusing errors and the tracking errors may be corrected while the movable unit is kept in its initial pre-set position.

Likewise, the magneto-optical (MO) signals may be detected using substantially 100% of the reflected light rotated towards right or left responsive to data recorded on the MO disc, the S/N ratio may be improved, while wavelength variations may be coped with.

In addition, the in-phase noise components may be eliminated and only signal components may be amplified and detected by detecting the MO signal by subtracting the light volume of the received light of the right-rotated S-polarized light component radiated on the first photodetector via the left rotation plate of the two-segment optical rotation plate, so that the MO signals can be detected reliably.

Furthermore, since the playback RF signals can be generated from directly received reflected light from the MO disc, signal components ranging from low to high ranges are comprised in the RF signals. Thus the playback RF signals with high S/N ratio may be formed, so that channel clocks may be correctly formed even in an optical disc employing the sample-servo format.

I claim:

1. An optical pickup device comprising:

a laser light source for radiating a laser light;

an objective lens for radiating an outgoing light from the laser light source to an optical disc;

optical rotation means arranged between said laser light source and said objective lens and being split into a right rotation plate and a left rotation plate along a splitting line extending along the radius of said optical disc with an optical axis as the center;

a light polarizing hologram arranged between said laser light source and said optical rotation means, said light polarizing hologram transmitting an outgoing light from said laser light source as it is from said laser light source without bending its light path and radiating a reflected light of said outgoing light radiated on said optical disc along a light path bent responsive to the direction of polarization;

light receiving means for receiving the reflected light from said optical disc incident via said light polarizing hologram and outputting a detection signal of an output level corresponding to the volume of the received light;

wherein said light receiving means has at least three photodetectors for respectively receiving a 0-order diffracted light, a +one order diffracted light component and a −one order diffracted light component of the reflected light from said optical disc passed through said optical rotation means by said light polarizing hologram;

wherein said at least three photodetectors of said light receiving means are arranged so that, when the photo-detector of said at least three photodetectors receiving the 0-order diffracted light component is in the just-focus state, the volume of light received by one of said at least three photodetectors receiving the +one order diffracted light component will be equal to the volume of light received by one of said at least three photodetectors receiving the −one order diffracted light component; and wherein said light polarizing hologram is a planar hologram in the shape of a diffraction lattice having a uniform lattice spacing throughout an entire hologram region; and wherein, with respect to the photodetector of said at least three photodetectors of said light receiving means receiving the 0-order diffracted light component, the photodetector receiving the +one order diffracted light component and the photodetector receiving the −one order diffracted light component are mounted with a pre-set distance ahead and at back of the optical axis.

2. An optical pickup device comprising:

a laser light source for radiating a laser light;

an objective lens for radiating an outgoing light from the laser light source to an optical disc;

optical rotation means arranged between said laser light source and said objective lens and being split into a right rotation plate and a left rotation plate along a splitting line extending along the radius of said optical disc with an optical axis as the center;

a light polarizing hologram arranged between said laser light source and said optical rotation means, said light polarizing hologram transmitting an outgoing light from said laser light source as it is from said laser light source without bending its light path and radiating a reflected light of said outgoing light radiated on said optical disc along a light path bent responsive to the direction of polarization;

light receiving means for receiving the reflected light from said optical disc incident via said light polarizing hologram and outputting a detection signal of an output level corresponding to the volume of the received light; and wherein said light polarizing hologram is split by a splitting line extending along the radius of the optical disc into an area having formed therein a light polarizing hologram in the shape of a diffractive lattice having coarse diffraction lattice spacing and an area having formed therein a light polarizing hologram in the shape of a diffractive lattice having dense diffraction lattice spacing; said light receiving means having photodetectors for receiving the +one order diffracted light component and the −one order diffracted light component of the reflected light having passed through the left rotation plate of said optical rotation means and having the light path bent by the area of said light polarizing hologram having one of the light polarizing patterns of said light polarizing hologram, said light receiving means also having photodetectors for receiving the +one order diffracted light component and the −one order diffracted light component of the reflected light having passed through the right rotation plate of said optical rotation means and having the light path bent by the area of said light polarizing hologram having the other light polarizing patterns of said light polarizing hologram.

3. An optical pickup device comprising:

a laser light source for radiating a laser light;

an objective lens for radiating an outgoing light from the laser light source to an optical disc;

optical rotation means arranged between said laser light source and said objective lens and being split into a right rotation plate and a left rotation plate along a splitting line extending along the radius of said optical disc with an optical axis as the center;

a light polarizing hologram arranged between said laser light source and said optical rotation means, said light polarizing hologram transmitting an outgoing light from said laser light source as it is from said laser light source without bending its light path and radiating a reflected light of said outgoing light radiated on said optical disc along a light path bent responsive to the direction of polarization;

light receiving means for receiving the reflected light from said optical disc incident via said light polarizing hologram and outputting a detection signal of an output level corresponding to the volume of the received light; and wherein said light polarizing hologram is split into four areas each having a center angle of 90° and having light polarizing hologram patterns formed for bending the reflected light having passed through the optical rotation means in four respectively different directions and radiating the thus bent reflected light; said light receiving means having a photodetector for receiving the O-order diffracted light component by the light polarizing hologram of the reflected light from the optical disc having passed through said optical rotation means and four photodetectors for receiving the reflected light bent in the four directions by said light polarizing hologram.

* * * * *